United States Patent [19]
Roth et al.

[11] Patent Number: 5,818,528
[45] Date of Patent: Oct. 6, 1998

[54] AUTOMATIC ELECTRONIC CAMERA FOR LABEL IMAGE CAPTURE

[75] Inventors: Stephen Anthony Roth, Aumsville; Lance Gordon Garland, Wilsonville, both of Oreg.; John William Sussmeier, Wappingers Falls, N.Y.; Ross Napoleon Kruse, Salem, Oreg.

[73] Assignee: United Parcel Service of America, Danbury, Conn.

[21] Appl. No.: 657,625

[22] Filed: May 30, 1996

Related U.S. Application Data

[62] Division of Ser. No. 328,660, Oct. 25, 1994, abandoned.

[51] Int. Cl.[6] .......................... H04N 5/228; H04N 5/238
[52] U.S. Cl. ........................ 348/364; 348/222; 348/229; 250/214 AG; 235/455; 396/213
[58] Field of Search ..................................... 348/207, 221, 348/222, 229, 230, 362, 363, 364, 365; 250/214 AG; 235/455; 396/213; H04N 5/228, 5/235, 5/238

[56] References Cited

U.S. PATENT DOCUMENTS

| | | | |
|---|---|---|---|
| 4,188,103 | 2/1980 | Biber et al. | 354/27 |
| 4,282,425 | 8/1981 | Chadima, Jr. et al. | 235/462 |
| 4,396,950 | 8/1983 | Roth | 358/213 |
| 4,471,228 | 9/1984 | Nishizawa et al. | 250/578 |
| 4,525,741 | 6/1985 | Chahal et al. | 358/212 |
| 4,538,060 | 8/1985 | Sakai et al. | 235/472 |
| 4,578,571 | 3/1986 | Williams | 235/472 |
| 4,660,082 | 4/1987 | Tomohisa et al. | 358/163 |
| 4,734,566 | 3/1988 | Senda et al. | 235/455 |
| 4,743,773 | 5/1988 | Katana et al. | 250/566 |
| 4,818,847 | 4/1989 | Hara et al. | 235/455 |
| 4,818,856 | 4/1989 | Matsushima et al. | 235/472 |
| 4,843,476 | 6/1989 | Fujioka et al. | 348/365 |
| 4,874,936 | 10/1989 | Chandler et al. | 235/494 |
| 4,877,949 | 10/1989 | Danielson et al. | 235/462 |
| 4,881,127 | 11/1989 | Isoguchi et al. | 358/213 |
| 4,900,907 | 2/1990 | Matusima et al. | 235/472 |
| 4,908,709 | 3/1990 | Inuiya et al. | 358/213 |
| 5,019,699 | 5/1991 | Koenck | 235/472 |
| 5,175,615 | 12/1992 | Ohara | 348/223 |
| 5,194,960 | 3/1993 | Ota | 358/228 |

(List continued on next page.)

FOREIGN PATENT DOCUMENTS

| | | | |
|---|---|---|---|
| 0411318A1 | 6/1990 | European Pat. Off. | H04N 5/238 |
| 0562657A2 | 3/1993 | European Pat. Off. | H04N 5/217 |
| WO 93/17397 | 9/1993 | WIPO | G06K 7/10 |
| WO 94/19764 | 9/1994 | WIPO | G06K 7/10 |

*Primary Examiner*—Andrew I. Faile
*Assistant Examiner*—Ngoc-Yen Vu
*Attorney, Agent, or Firm*—Jones & Askew, LLP

[57] ABSTRACT

A hand held label reader is capable of illuminating a label, capturing a digital image of two-dimensional information indicia on the label, and decoding the digital image to provide decoded output data to a terminal. The target label is illuminated by a low variation illuminator that includes a circular LED array mounted behind a plano-concave dispersing lens. The automatic electronic camera, which includes a CCD camera and control circuitry, uses three images to adjust the intensity of the digital image and store a properly exposed image of the label in video RAM. The intensity of the digital image is adjusted by controlling the video system gain via adjusting the CCD array's integration time, the gain of a video amplifier, and the gain provided by an analog-to-digital converter. The gain provided by the analog-digital-converter is adjusted to compensate for the attenuation of light through the camera's lens assembly. For the first image, the digital image is obtained using a default setting for the gain. The image intensity is analyzed using a histogram process and new gain setting are determined. The second image is obtained using the gain settings derived from the first image. The second image intensity is analyzed and the gain settings are adjusted. These settings are used for the third video image. The digital image from the third image is stored in video RAM, where it is available to be decoded by a microprocessor.

9 Claims, 20 Drawing Sheets

U.S. PATENT DOCUMENTS

| | | | |
|---|---|---|---|
| 5,247,367 | 9/1993 | Lee | 358/213.19 |
| 5,258,848 | 11/1993 | Kondo et al. | 348/229 |
| 5,278,399 | 1/1994 | Sano | 235/472 |
| 5,278,659 | 1/1994 | Araki | 358/213.19 |
| 5,280,161 | 1/1994 | Niwa | 235/462 |
| 5,291,008 | 3/1994 | Havens et al. | 235/462 |
| 5,308,960 | 5/1994 | Smith et al. | 235/454 |
| 5,313,373 | 5/1994 | Bjorner et al. | 362/19 |
| 5,325,276 | 6/1994 | Sullivan | 362/84 |
| 5,343,302 | 8/1994 | Yamashita | 348/251 |
| 5,378,883 | 1/1995 | Batterman et al. | 235/472 |
| 5,426,517 | 6/1995 | Schwartz | 358/520 |

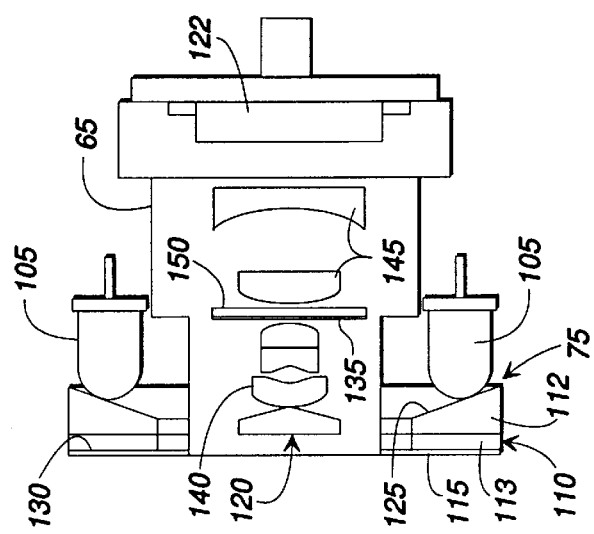
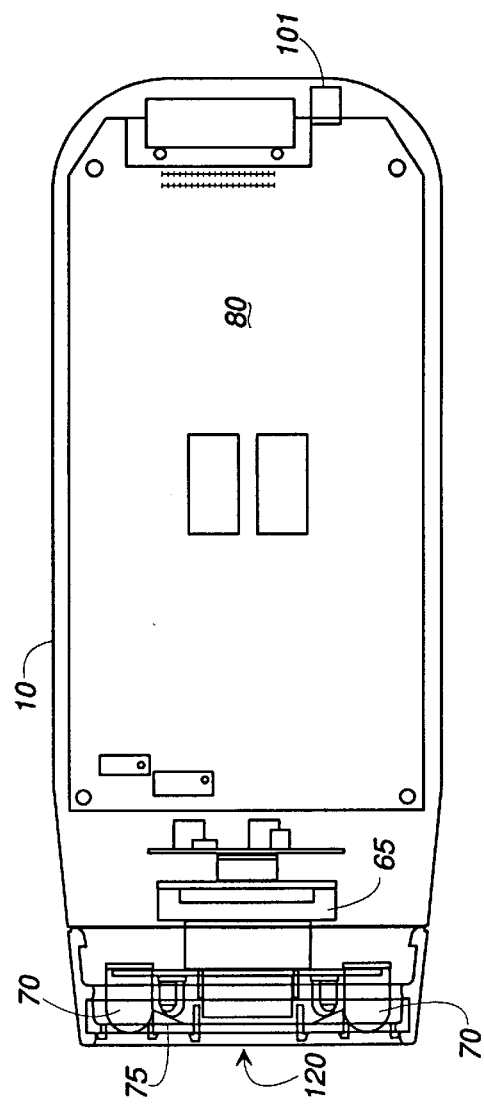
FIG. 5
FIG. 4

FIG. 8 CPU BOARD

| CONTROL VALUE | GAIN (DB) | SHUTTER SPEED | VIDEO AMP GAIN (DB) | A/D REF (DB) | +6 DB |
|---|---|---|---|---|---|
| 71 | 53.25 | 1/250 | 18 | 5.25 | 6 |
| 70 | 52.50 | I | I | 4.50 | I |
| 69 | 51.75 | I | I | 3.75 | I |
| 68 | 51.50 | I | I | 3.00 | I |
| 67 | 50.25 | I | I | 2.25 | I |
| 66 | 49.50 | I | I | 1.50 | I |
| 65 | 48.75 | I | I | 0.75 | I |
| 64 | 48.00 | I | I | 0.00 | 6 |
| 63 | 47.75 | I | I | 5.25 | 0 |
| 62 | 46.50 | I | I | 4.50 | I |
| 61 | 45.75 | I | I | 3.75 | I |
| 60 | 45.00 | I | I | 3.00 | I |
| 59 | 44.25 | I | I | 2.25 | I |
| 58 | 43.50 | I | I | 1.50 | I |
| 57 | 42.75 | I | I | 0.75 | I |
| 56 | 42.00 | I | 18 | 0.00 | I |
| 55 | 41.25 | I | 12 | 5.25 | I |
| 54 | 40.50 | I | I | 4.50 | I |
| 53 | 39.75 | I | I | 3.75 | I |
| 52 | 39.00 | I | I | 3.00 | I |
| 51 | 38.25 | I | I | 2.25 | I |
| 50 | 37.50 | I | I | 1.50 | I |
| 49 | 36.75 | I | I | 0.75 | I |
| 48 | 36.00 | I | 12 | 0.00 | I |
| 47 | 35.25 | I | 6 | 5.25 | I |
| 46 | 34.50 | I | I | 4.50 | I |
| 45 | 33.75 | I | I | 3.75 | I |
| 44 | 33.00 | I | I | 3.00 | I |
| 43 | 32.25 | I | I | 2.25 | I |
| 42 | 31.50 | I | I | 1.50 | I |
| 41 | 30.75 | I | I | 0.75 | I |
| 40 | 30.00 | I | 6 | 0.00 | I |
| 39 | 29.25 | I | 0 | 5.25 | I |
| 38 | 28.50 | I | I | 4.50 | I |
| 37 | 27.75 | I | I | 3.75 | I |
| 36 | 27.00 | I | I | 3.00 | I |
| 35 | 26.25 | I | I | 2.25 | I |
| 34 | 25.50 | I | I | 1.50 | I |
| 33 | 24.75 | I | I | 0.75 | I |
| 32 | 24.00 | 1/250 | I | 0.00 | I |
| 31 | 23.25 | 1/500 | I | 5.25 | I |

MATCH LINE TO FIG. 12b

MATCH LINE TO FIG. 12a

| | | | | | |
|---|---|---|---|---|---|
| 30 | 22.50 | | | 4.50 | |
| 29 | 21.75 | | | 3.75 | |
| 28 | 21.00 | | | 3.00 | |
| 27 | 20.25 | | | 2.25 | |
| 26 | 19.50 | | | 1.50 | |
| 25 | 18.75 | | | 0.75 | |
| 24 | 18.00 | 1/500 | | 0.00 | |
| 23 | 17.25 | 1/1000 | | 5.25 | |
| 22 | 16.50 | | | 4.50 | |
| 21 | 15.75 | | | 3.75 | |
| 20 | 15.00 | | | 3.00 | |
| 19 | 14.25 | | | 2.25 | |
| 18 | 13.50 | | | 1.50 | |
| 17 | 12.75 | | | 0.75 | |
| 16 | 12.00 | 1/1000 | | 0.00 | |
| 15 | 11.25 | 1/2000 | | 5.25 | |
| 14 | 10.50 | | | 4.50 | |
| 13 | 9.75 | | | 3.75 | |
| 12 | 9.00 | | | 3.00 | |
| 11 | 8.25 | | | 2.25 | |
| 10 | 7.50 | | | 1.50 | |
| 9 | 6.75 | | | 0.75 | |
| 8 | 6.00 | 1/2000 | | 0.00 | |
| 7 | 5.25 | 1/4000 | | 5.25 | |
| 6 | 4.50 | | | 4.50 | |
| 5 | 3.75 | | | 3.75 | |
| 4 | 3.00 | | | 3.00 | |
| 3 | 2.25 | | | 2.25 | |
| 2 | 1.50 | | | 1.50 | |
| 1 | 0.75 | | | 0.75 | |
| 0 | 0.00 | 1/4000 | 0 | 0.00 | 0 |

AUTOMATIC ELECTRONIC CAMERA FOR LABEL IMAGE CAPTURE

This is a division of application Ser. No. 08/328,660, filed Oct. 25, 1994 now abandoned.

TECHNICAL FIELD

The present invention relates to devices for reading codes on labels, and more particularly relates to a non-contact electronic camera system capable of reading and decoding a wide variety of label formats in lighting conditions ranging from bright sunlight to complete darkness.

BACKGROUND OF THE INVENTION

Various types of machine-readable codes and electronic code readers are known in the art. Electronic code readers are useful because they automatically collect data embodied in machine-readable codes, thereby allowing data to be collected more quickly and more accurately than is possible with manual data entry.

Laser scanners are commonly used to read one-dimensional bar codes, which are used in a variety of applications. For example, bar codes appear on a wide variety of goods and merchandise, and on shipping labels that are affixed to packages. Once a bar code is read and decoded by a suitable bar code reader, a computer may use the decoded number to access associated data that has been stored in a database. For example, with goods and merchandise, each product has a unique bar code number, and the associated data would identify the product and its price, manufacturer, etc. With a package, the label number would uniquely identify the package, and the associated data would include information such as the size and weight of the package, the origin and destination addresses, and type of service selected (e.g., overnight delivery, second day delivery etc.).

In the case of portable, non-contact bar code readers, the laser beam that is used to read the label also serves two other important functions. The laser beam projects a visible line that allows the user to aim the bar code reader at the target label, and to properly orient the bar code reader with respect to the bar code's axis. In addition, the intensity and wavelength of the laser light are such that the ambient lighting conditions in stores, offices, warehouses, etc. do not affect the bar code reader's ability to read the label.

One-dimensional bar codes are best suited for applications requiring a maximum of approximately 15 characters. In order to encode larger amounts of data using one-dimensional bar codes, the bar codes must be relatively large. This results in labels that are too large to fit on small items, and which require relatively large amounts of paper.

In order to practically encode larger amounts of data, compact two-dimensional codes or symbologies have been developed. For example, a hexagonal coding symbology can encode up to 100 characters in an area that is approximately 1 inch square. Such a symbology is disclosed in U.S. Pat. Nos. 4,998,010, entitled "Polygonal Information Encoding Article, Process and System," and 4,874,936, entitled "Hexagonal, Information Encoding Article, Process and System," the disclosures of which are incorporated herein by reference and made a part hereof. When used on package labels, these two-dimensional symbologies allow shipping information such as origin, destination, weight, type of service, etc. to be read directly from the label, without requiring associated data to be looked up in a centralized data base.

The conventional laser scanners that are used to read one-dimensional bar codes are not capable of reading two-dimensional codes. However, cameras that employ charge coupled device (CCD) arrays are capable of "capturing" two-dimensional images, which may include one-dimensional or two-dimensional codes. Once the output of the CCD camera is digitized, it may be stored and/or manipulated prior to being decoded. The ability to "rotate" the image data after the image is captured allows a code to be captured and decoded even if the camera is not precisely aligned with a particular axis of the code.

Because a CCD camera captures a two-dimensional image and provides image data to a decoding algorithm, a label reading device employing a CCD camera is as versatile as the decode algorithms programmed in the device. This allows a single reader to be used to capture and decode various types of bar codes and two-dimensional symbologies, provided the appropriate decoding algorithm is available. Examples of such cameras and associated methods are disclosed in U.S. Pat. Nos. 5,329,105, entitled "Method and Apparatus for Determining the Width of Elements of Bar Code Symbols." 5,308,960, entitled "Combined Camera System," and 5,276.315, entitled "Method and Apparatus for Processing Low Resolution Images of Degraded Bar Code Symbols," the disclosures of which are incorporated herein by reference.

Compact CCD cameras are readily available and well suited to this application. However, the algorithms that are used to decode the captured image data work best when the captured image is neither too bright nor too dark, and when the image intensity and contrast are fairly constant across the entire image. Therefore, it is necessary to ensure that the captured image has the proper intensity, which is affected by several factors, including the illumination source, the camera optics, and the gain of the video system.

The process of capturing an image, which is analogous to taking a snap-shot with a conventional photographic camera, involves focusing an image on the CCD array, and allowing electrical charge to accumulate in the CCD array's photo-elements. The rate of charge accumulation in a photoelement is dependent on the incident light level. The intensity of the captured image is determined by integrating the rate of charge accumulation with respect to time. By varying the integration period, the amount of charge collected for a given light level, and the intensity of the captured image, can be varied. The integration period is also referred to as the camera's exposure period or electronic shutter speed.

The image function falling on the CCD can be described as the product of two functions. The first function is the contrast function of the object that is being illuminated and imaged. The second function is the combined effect of the illumination and camera's lens. The first function represents the contrast between the black and white elements that make up a bar code or two-dimensional code. The second is undesirable and should be corrected to the extent possible by various features of the camera.

In order to minimize the undesirable effects of the illumination source, it is necessary to illuminate the target label with light that is consistent over the camera's entire field of view. Although various types of illuminators are known in the art, there is a need in the art for an illuminator that provides light having little local variation and which is consistent across the entire two-dimensional field of view. In addition, the quality of the illumination light pattern should be consistent over a range of object distances corresponding to the camera's depth of field.

Even when the target label is perfectly illuminated, the CCD camera's lens assembly causes attenuation that affects the captured image. For example, in some CCD cameras, the image produced by the lens falls off by a factor of nearly $\cos^4(\theta)$ even when the object is perfectly illuminated. At the corners of the image, the intensity may be little as 50% of the intensity at the center. Therefore, there is a need in the art for a camera that corrects the attenuation caused by the camera's lens assembly.

Because a hand held label reader may be used in environments where the lighting conditions range from direct sunlight to relatively dim lighting, the hand held label reader preferably is able to ensure that the intensity of the captured image is satisfactory over the entire range of light conditions. This can be accomplished with an aperture that is small enough to provide sufficient depth of field and to prevent direct sunlight from damaging the CCD array. The camera's shutter speed must also remain fast enough to prevent blurred images due to movement of the reader. Therefore, there is a need in the art for camera having an overall video gain adjustment with sufficient dynamic range to compensate for the anticipated lighting conditions. Furthermore, there is a need for a camera that is capable of accurately determining the lighting conditions and selecting the video gain in order to ensure the proper image intensity.

Although the prior art includes label imagers that provide illumination sources and exposure control, there remains a need in the art for an automatic electronic camera that provides flat illumination and compensates for the falloff effect associated with the camera's lens assembly. Furthermore, there is a need for an automatic electronic camera with an overall video gain adjustment sufficient to compensate for the dynamic range of the illuminating light while constraining the camera's electronic speed and aperture. There is also a need for a camera that accurately controls the image intensity regardless of the level of incident light.

SUMMARY OF THE INVENTION

The present invention is directed to an automatic electronic camera that satisfies the previously described needs and produces an electronic image of high quality suitable for the purpose of capturing and decoding a wide variety of label formats.

An automatic electronic camera having the features of the present invention includes an imager, an illuminator, video circuitry for providing digitized image data and control circuitry for analyzing lighting conditions and adjusting the gain of the video circuitry. The illuminator produces a symmetric, low variation illumination pattern, which is maintained throughout the imager's field of view and depth of field. The control circuitry adjusts the gain of the imager and video circuitry to compensate for variations associated with the imager's optics and to allows operation over ambient conditions from full sunlight to total darkness.

Generally described, one aspect of the present invention provides an illuminator for illuminating an area containing a target to be imaged by a camera. The illuminated area includes the camera's field of view. The illuminator includes a plurality of light sources arranged in a ring about the camera. Each of the light sources projects a generally circular shaped beam of light toward the target. A dispersing lens assembly is located between the light sources and the target. The dispersing lens assembly is shaped so as to disperse the circular beams in a manner that approximately evenly illuminates the area.

In another aspect, the present invention provides a method for correcting the effects of attenuation caused by a lens associated with an electronic camera. The method includes storing a series of values that correspond to the attenuation function. The stored values are used to create a signal that corresponds to each of the pixels included in a video field provided by the camera. For each pixel provided by the camera, the corresponding signal level is used to adjust the gain of an amplifier.

More particularly described, the present invention provides a corrective camera that corrects for a lens attenuation function having a generally parabolic shape. Gain values corresponding to the attenuation located at various points in the image are stored in a memory device. The stored values are retrieved and filtered prior to being matched to the corresponding pixel. The filtered signal is then used to adjust the video gain in order to compensate for the lens attenuation function's effect on that pixel.

Still more particularly described, the present invention provides an electronic camera for producing a digital image whose contrast is nearly constant over a field of view. The electronic camera includes an image sensor with an optical assembly that defines an optical axis and a field of view and depth of field for image capture by the image sensor. The camera includes a plurality of light sources positioned approximately in a ring concentric with the optical assembly, and at least one lens shaped to project light from the light sources in a pattern whose form remains approximately constant and consistent from center to edge through the depth of field. The camera also includes means for generating a digital image from an output signal from the image sensor, and an image corrector configured to adjust the digital image to compensate for undesired effects of the optical assembly and the light pattern. This is accomplished by applying a correction that varies as a function of angle from the optical axis.

In yet another aspect, the present invention provides a method for applying a histogram technique to evaluate the intensity of an image produced by an electronic camera and controlling the gain of the camera. The method includes providing first and second memories. The first memory includes a bit corresponding to each pixel in a video field produced by the camera. The second memory includes a bin corresponding to each possible intensity level of the pixels. A predetermined number of the bits in the first memory are defined as test bits, which correspond to the pixels to be evaluated. The pixels in the video field are synchronized to the bits in the memory. For each pixel that corresponds to a test bit, the value in the bin corresponding to the intensity of that pixel is incremented. The values in the bins are sequentially summed and the method determines when the sum exceeds a predetermined number. A last bin value is defined as the last bin summed prior to the sum exceeding the predetermined value. The last bin value is provided as an output and is used to adjust to gain of the camera.

More particularly described, the present invention provides an electronic camera for producing a desirable digital image over a range of light intensities reflected from a subject. The camera comprises an image sensor assembly that includes an adjustable shutter speed control and means for generating an analog image signal. The analog image signal is amplified by a video gain circuit, which outputs an amplified analog image signal. The analog image signal is converted to a digital image signal by an analog-to-digital (A/D) converter that includes an A/D gain controller responsive to an A/D reference input. An image intensity evaluator circuit is configured to receive the digital image signal and to output a correction signal that varies with the intensity of at least a portion of the digital image signal. The shutter speed control, video gain circuit, and A/D reference input are responsive to the correction signal.

In a preferred embodiment, the output signal provided by the intensity evaluator circuit is determined by applying a histogram technique to analyze the digital image signal. The output of the histogram technique is used to select the appropriate control signals from a look up table. The appropriate gain control signals are applied to the shutter speed control, video gain circuit, and A/D reference input.

Accordingly, it is an object of the present invention to provide an electronic camera that provides consistent illumination across its field of view and compensates for variations in image intensity resulting from its optical characteristics.

It is another object of the present invention to provide a light source that produces a low variation illumination pattern that is consistent over an imager's field of view.

It is another object of the present invention to provide a light source that produces a low variation illumination pattern that is consistent over an imager's depth of field.

It is another object of the present invention to provide an electronic camera that compensates for variations in image intensity resulting from the camera's optics.

It is another object of the present invention to provide an electronic camera that compensates for variations in image intensity resulting from variations in the illumination pattern.

It is another object of the present invention to provide an electronic camera that provides a video system gain adjustment sufficient to allow operation over ambient conditions ranging from direct sunlight to total darkness.

It is another object of the present invention to provide an electronic camera that adjusts the video system gain in response to the intensity of a test image.

It is another object of the present invention to provide an electronic camera that applies a histogram technique to a test image in order to determine the video system gain required to produce an image having the desired intensity.

It is another object of the present invention to provide an electronic camera that applies a gain control function to adjust the imager's shutter speed, and the gain of a video amplifier and an analog-to-digital converter.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 4 is a cross sectional top view of the hand held label reader of FIG. 1.

FIG. 5 is a cross sectional view of the camera assembly and illumination light source that form a part of the hand held label reader of FIG. 1.

FIG. 12 is a table illustrating the gain control values provided by the gain look up table.

DETAILED DESCRIPTION OF THE PREFERRED EMBODIMENT

Figure 1:
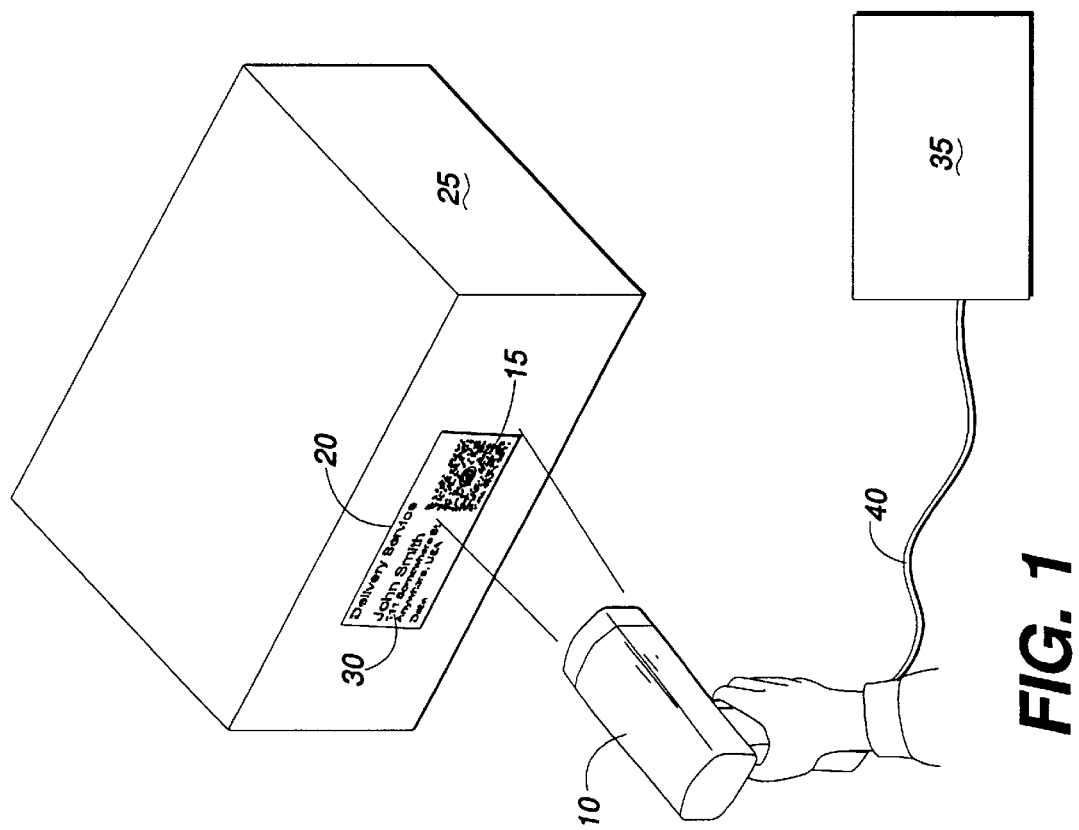
FIG. 1 is a perspective view of a hand held label reader that incorporates an automatic electronic camera according to the present invention being used to read a label on package.

Referring now to the drawings, in which like numerals represent like elements throughout the several figures. FIG. 1 illustrates a hand held label reader 10 that incorporates an automatic electronic camera embodying the present invention.

Before describing the structure of the reader 10 in detail, the function and operation of the reader will he summarized. The primary function of the hand held label reader 10 is to capture and decode one- and two-dimensional codes that are used on package labels. The decoded label data is provided to a data terminal, where it may be combined with other package related data, such as the signature of the person that accepts delivery of the package. All of the package data may then be transmitted by the data terminal to the shipping company's central computer where it is used for tracking and billing purposes.

In order to capture and decode the data provided on the package label, the hand held label reader 10 incorporates an automatic electronic camera that includes a charge coupled device (CCD) camera and the electronics needed to control the camera and decode the data provided by the camera. The automatic electronic camera also includes a self-contained illuminator that produces a symmetric, low variation light pattern.

Before a label reading operation begins, the hand held label reader is in an idle state. In the idle state, the hand held label reader's control circuitry turns off power to most of the other components. Marker lamps are turned on during the idle state in order to facilitate proper aiming of the hand held label reader. A label reading operation is initiated when an operator squeezes a trigger. At that point, the control circuitry applies power to the camera and other electronic circuitry, and causes the components to be reset. An intensity evaluating circuit then determines the shutter speed and video gain settings that are needed to obtain a digital image having the proper intensity. After a digital image of the label is captured using these settings a microprocessor decodes the stored label image data and outputs the data to the attached data terminal. At that point, the hand held label reader returns to the idle state.

Turning now to FIG. 1, the preferred hand held label reader 10 has a pistol-like shape so that it can be easily held in one hand. The hand held label reader 10 is capable of capturing and decoding images of a wide variety of label formats, such as a two-dimensional code 15 or a one-dimensional bar code (not shown) that is printed on a label 20 on a package 25. The label 20 also includes printed alphanumeric characters 30 that provide information such as a package identification number, the recipient and the destination address. After the label image data is decoded by the hand held label reader, the decoded image data is provided to a data terminal 35 via a cord 40. The data terminal 35 may be virtually any type of portable or desk top computer or data terminal. Data communication between the reader and the terminal could alternately be accomplished via optical, infrared, or RF link.

Figure 3:
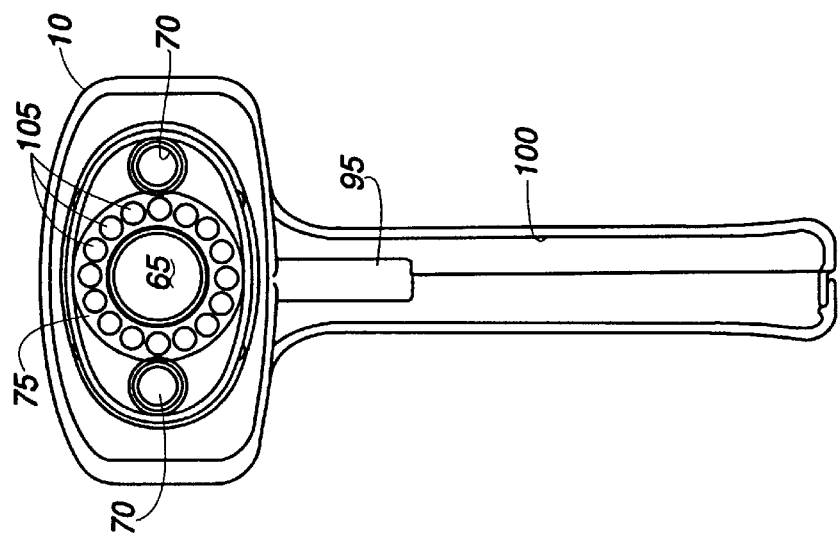
FIG. 3 is a front view of the hand held label reader of FIG. 1.
Figure 2:
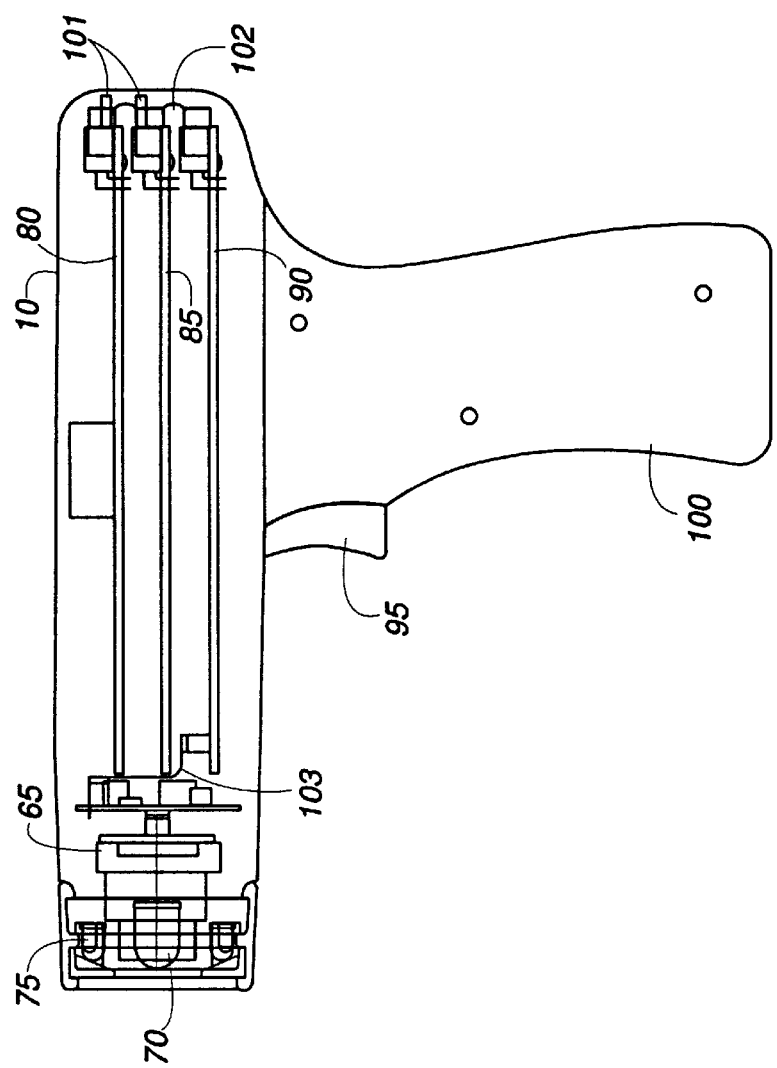
FIG. 2 is a cross sectional side view of the hand held label reader of FIG. 1.

FIGS. 2–4 illustrate the primary components of the preferred hand held label reader 10. FIG. 2 is a cross sectional side view of the hand held label reader 10 illustrating the arrangement of the camera assembly, printed circuit boards (PCBs) and other components. FIG. 3 is a front view of the hand held label reader 10 illustrating the illumination light source. FIG. 4 is a top cross sectional view of the hand held label reader 10 illustrating the arrangement of the camera assembly and printed circuit boards.

The hand held label reader 10 includes a camera assembly 65, marker lamps 70, and an illumination light source 75. The electronic circuitry includes three printed circuit boards (PCBs), including a control board 80. CPU board 85, and analog-to-digital (A/D) board 90. A trigger 95, which is attached to a handle 100, is used by the operator to initiate a label reading operation. Indicator lamps 101 are used to indicate the status of the hand held label reader and whether a decode operation has been successful.

The PCBs are connected to each other via a flexible flat cable 102. Those skilled in the art will appreciate that the cable 102 acts as a backplane that provides power and various data and control signals between the PCBs. The camera assembly 65 is connected to the A/D board 90 by a video cable 103. The video cable is used to carry analog video output and timing signals from the camera assembly to the A/D board 90. The video cable is also used to carry control signals from the A/D board 90 to the camera assembly 65. The control. CPU and A/D boards are discussed more completely below.

The preferred marker lamps 70 are type AND190AOP light emitting diodes manufactured by AND. The marker lamps are mounted on a separate printed circuit board in the front end of the hand held label reader. The marker lamps face forward toward the target label, and are aligned with the horizontal axis of the camera's CCD array. Each of the marker lamps 70 projects a beam of light that forms a spot on the target surface, with the center of the camera's field of view being located between the spots. The marker lamps allow the operator to properly aim the camera by locating the center of the target code between the two spots.

FIG. 5 provides a more detailed illustration of the camera assembly 65 and illumination light source 75. The preferred camera is a type M37/CE high resolution CCIR format CCD camera, manufactured by Sony. A lens assembly 120 with a focal length of 5 mm is used to form an image on a CCD array 122. This provides a relatively wide field of view that measures approximately 53° horizontal (H) by 41° vertical (V). The size of the image that is formed on the CCD array 122 is 4.89 mm (H) by 3.64 mm (V). The object distance for ideal focus is 149 mm. The field of view at the ideal focus distance (149 mm) is 141 mm (H) by 105 mm (V) (5.54"× 4.13"). The depth of field is ±50 mm around the ideal focus. Those skilled in the art will appreciate that the intensity of the image produced by this lens assembly falls off by a factor of approximately $\cos^4(\theta)$ even when the object is perfectly illuminated. Therefore, at the corners of an evenly illuminated image, where $\theta=32°$, the image intensity is approximately 52% of the intensity at the center of the image.

Those skilled in the art will appreciate that the preferred camera 65 is modified in order to allow access to certain internal signals. Instead of using a standard video output signal, which is filtered, and includes synchronization signals and blanking, the camera 65 is modified to provide an analog CCD video output signal that includes the pixel voltages taken directly off the CCD's sample and hold circuit. Thus, the CCD video output is a series of analog signals corresponding to each of the picture elements (pixels) that make up the CCD array. Each video field begins at the top left corner of the image and shifts out the pixels row by row until all of the pixels have been output. The camera is also modified to provide three relevant timing signals. A 14.318 MHz pixel clock signal indicates when a new pixel is being clocked out. A vertical drive (VDRV) signal indicates the beginning of a new field. A horizontal drive (HDRV) signal indicates the beginning of a new row. The camera's internal blanking signal is disabled in order to allow the pixel voltage from unexposed (i.e., black) reference pixels to be output via the CCD video output signal. The camera also provides a black pixel timing signal that indicates when the CCD output corresponds to the black pixels. As described below, the black pixel reference is used to DC restore a video amplifier. The A/D board generates a trigger pulse, which is used by the camera to begin an exposure.

The preferred camera includes CCD elements corresponding to even and odd fields, which would be interlaced in normal video applications. However, in the present invention, the label image is captured using a single field of the high resolution camera, without regard to whether it is an even or odd field. Using a single video field provides an image field of 752 (H)×291 (V) pixels, which each measure 6.4 microns (H)×12.5 microns (V). This provides a resolution in the object plane of 136.5 dpi (H)×70 dpi (V) at the ideal focus distance of 149 mm. The resolution at angles other than purely horizontal or vertical equals the vector sum of the horizontal and vertical resolutions. In order to reliably decode a label with elements having widths of 15 mils (0.015 inches), the camera should provide a resolution of at least 100 dots per inch (dpi). Thus, the camera will provide sufficient resolution when the horizontal axis of the target label is within 62.4° of the horizontal axis of the camera.

The object to be imaged is illuminated by a circular array of 16 LEDs 105, which is mounted in the front end of the hand held label reader 10. The circular array is positioned around the camera lens as is illustrated more clearly in FIGS. 3 and 4. The preferred LEDs are type AND120CR LEDs. manufactured by AND. The preferred LEDs emit deep red light having a wavelength of 660 nanometers (nm). An advantage of using deep red LEDs is that commonly used label inks are required to work with laser scanners whose wavelengths lie between 630 and 680 nm. It also allows the use of red colored marking pens to mark on the shipping labels. The red ink from the marking pen will be visible to people, but will be transparent to the camera. In addition, the human eye is much less sensitive to light having wavelengths in this range. Therefore, a burst of deep red light is perceived as much dimmer than a burst of white light of the same energy. Red light also has less effect on the night vision of the user.

Referring to FIG. 5, the LEDs 105 face straight forward, and are located behind a dispersing lens assembly 110, which includes a dispersing ring lens 112, such as a planoconcave lens, a diffusing layer 113, and a polarizing filter 115. The camera lens assembly 120 is located at the center of the LED array. The preferred dispersing ring lens 112 is a planoconcave lens formed from a clear epoxy material. The outer face 130 is flat, that is, perpendicular to the optical axis of the camera. The inner face 125 includes a portion that is parallel to the outer face, and a portion that diverges from the outer face at an angle of 25°, thus forming a portion of a cone opening toward the CCD 122. The thin portion of the dispersing ring lens is approximately 0.060 inches thick, while the thickest portion is approximately 0.250 thick. The preferred dispersing ring lens 112 has a refractive index of 1.52, and approximates the effect of a piano convex lens of focal length −3.0. The planoconcave lens may be replaced by a negative focal length fresnel lens.

The inner face 125 of the dispersing ring lens 112 is highly polished. The outer face 130 is fairly diffuse in order to allow it to be bonded to the diffusing layer 113. The preferred diffusing layer 113 is formed from type DFA-12light difussing film, manufactured by Minnesota Mining and Manufacturing Co. The diffusing layer 113 is bonded to the polarizing lens 115.

The diameter of the dispersing lens assembly 110 is made as small as possible. The outer diameter is approximately 1.5 inches. The diameter of the circle formed by the centers of the LEDs 105 is approximately 1.2 inches. This allows the illumination light source 75 to approximate a light source that is coincident with the camera lens itself, and results in an illumination pattern that has a very small variation when the object distance is changed.

Figure 6:
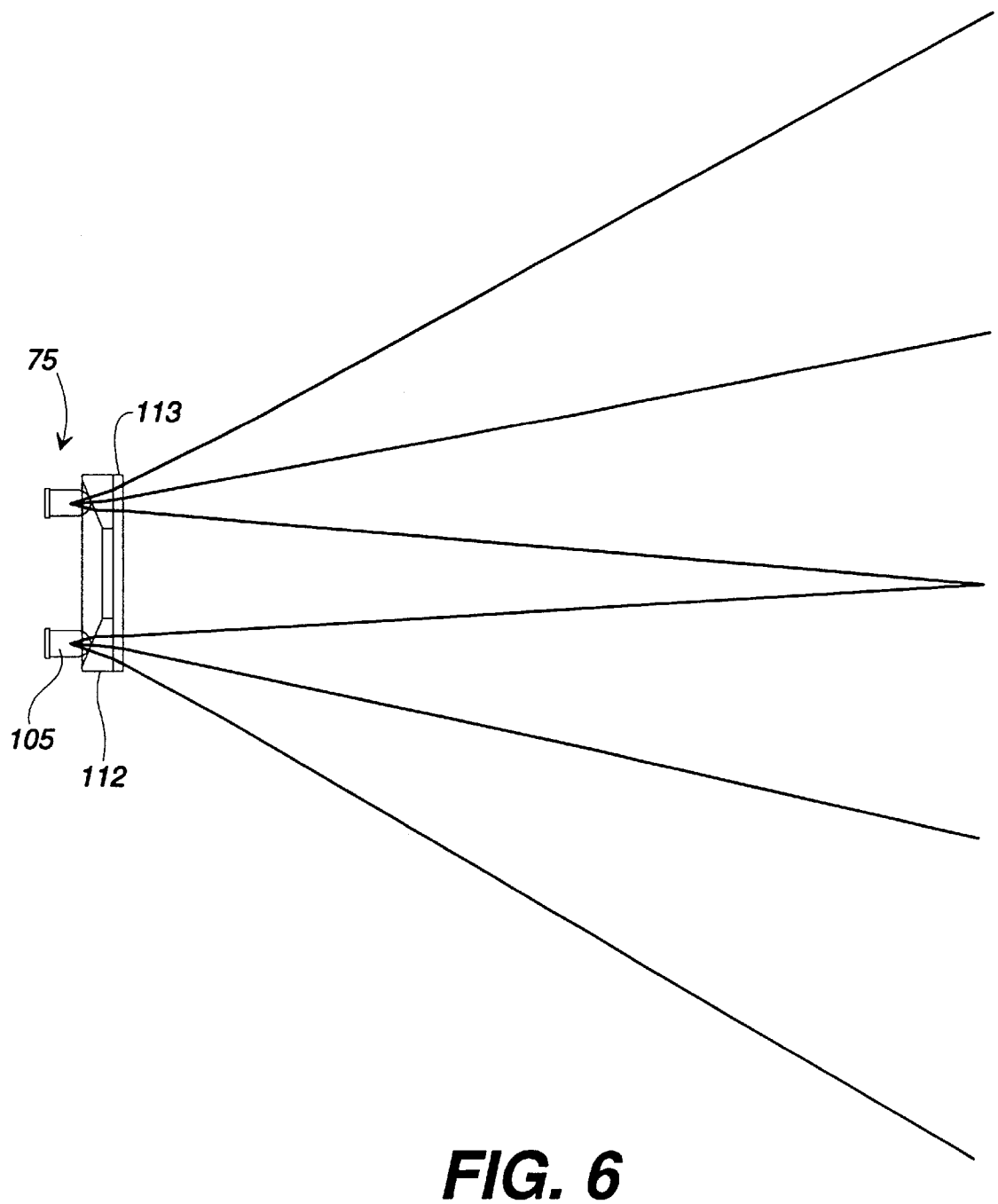
FIG. 6 is a diagram that illustrates the illumination pattern produced by the illumination light source that forms a part of the hand held label reader of FIG. 1.

FIG. 6 illustrates the effect of the dispersing ring lens 112, without the effect of the diffusing layer. Each LED 105 emits a 35° circular beam pattern. In a perfectly focused system, the dispersing ring lens 112 would cause each LED's beam pattern to be diverted or bent away from the center (i.e., optical axis) by approximately 13.4°, which causes the circular patterns to be stretched into ellipses.

The diffusing layer 113 is essential because it spreads the light transmitted through the dispersing ring lens 112. At short objects distances, this eliminates a dim spot in the center of the image. In addition, the diffusing layer removes local irregularities or bright spots in the illumination pattern. The sum of the diffuse elliptical patterns is a total pattern which has little local variation and is consistent from center to edge. Thus, the illumination pattern is consistent enough to allow the use of an illumination correction technique that accounts for angular variation only. As mentioned above, the intensity of the image produced by the camera lens assembly 120 falls off by a factor of approximately $\cos^4(\theta)$ even when the object is perfectly illuminated.

Referring again to FIG. 5, the light from the LEDs 105 is polarized by the polarizing filter 115. Furthermore, a separate orthogonal polarizing filter 135 is located in the camera lens assembly 120. This cross-polarization is advantageous because it allows direct reflections from a glossy surface (e.g. a clear plastic label protector or the front surface of slick paper) to be discriminated from diffuse reflections from dull surfaces (i.e. paper label). Cross-polarization of the light from the illumination light source and the reflected light also reduces glare from the LED Illuminator. The contrast of label elements is greatly increased by the use of polarizing filters when observing labels with shiny surfaces.

The camera lens assembly 120 includes a front lens group 140 and a rear lens group 145. The lens aperture plane is located between the front and rear lens groups. In the preferred hand held label reader, the camera operates with a fixed circular aperture. This eliminates the need for an adjustable iris or other assembly in the aperture plane. Instead, the polarizing filter 135 and a narrow bandpass filter 150 are placed in the aperture plane.

Those skilled in the art will understand that the transmissibility of light through the narrow bandpass filter can change dramatically as angle of the incident light increases. Thus, as the ray angles become too great, there will be a large falloff in the image brightness at the edges. This effect is reduced by placing the filter in the aperture plane between the front and rear lens groups. This placement of the polarizing and bandpass filters also prevents local defects in the filters from being imaged by the camera, and protects the filters from damage.

The preferred narrow bandpass filter has a pass band from 640 to 720 nm. The bandpass is chosen to minimize the effect of the change in the filter's characteristics that occurs as the incident angles are increased. The filter's bandpass center becomes shorter when the angles are increased. Therefore, choosing the filter so that the chosen LED wavelength falls on the short wavelength end of the bandpass reduces the attenuation as the angle between the light rays and the polarizing filter increases.

The bandpass filtering reduces the intensity of sunlight and other broad band sources by a factor of approximately 8:1, but has very little effect on the red light from the illumination light source 75. This attenuation results in a reduction in the dynamic range that is required in the camera, thereby allowing the use of a fixed aperture. Flicker and glare from indoor light sources are also reduced by the bandpass filter. Fluorescent light varies at a rate of 120 Hz, which makes it difficult to determine the proper exposure. In a typical office environment, ceiling lights causes multiple glare spots on shiny labels. The bandpass filter reduces this glare from ambient light. The polarizing filter 135 reduces all light by a factor of 2.5:1. The combined attenuation of broad band sources is 20:1. This attenuation and a fixed aperture of not larger than f/5.6 assures the imaging CCD will not be damaged by direct sunlight being focused on the CCD.

Figure 7:
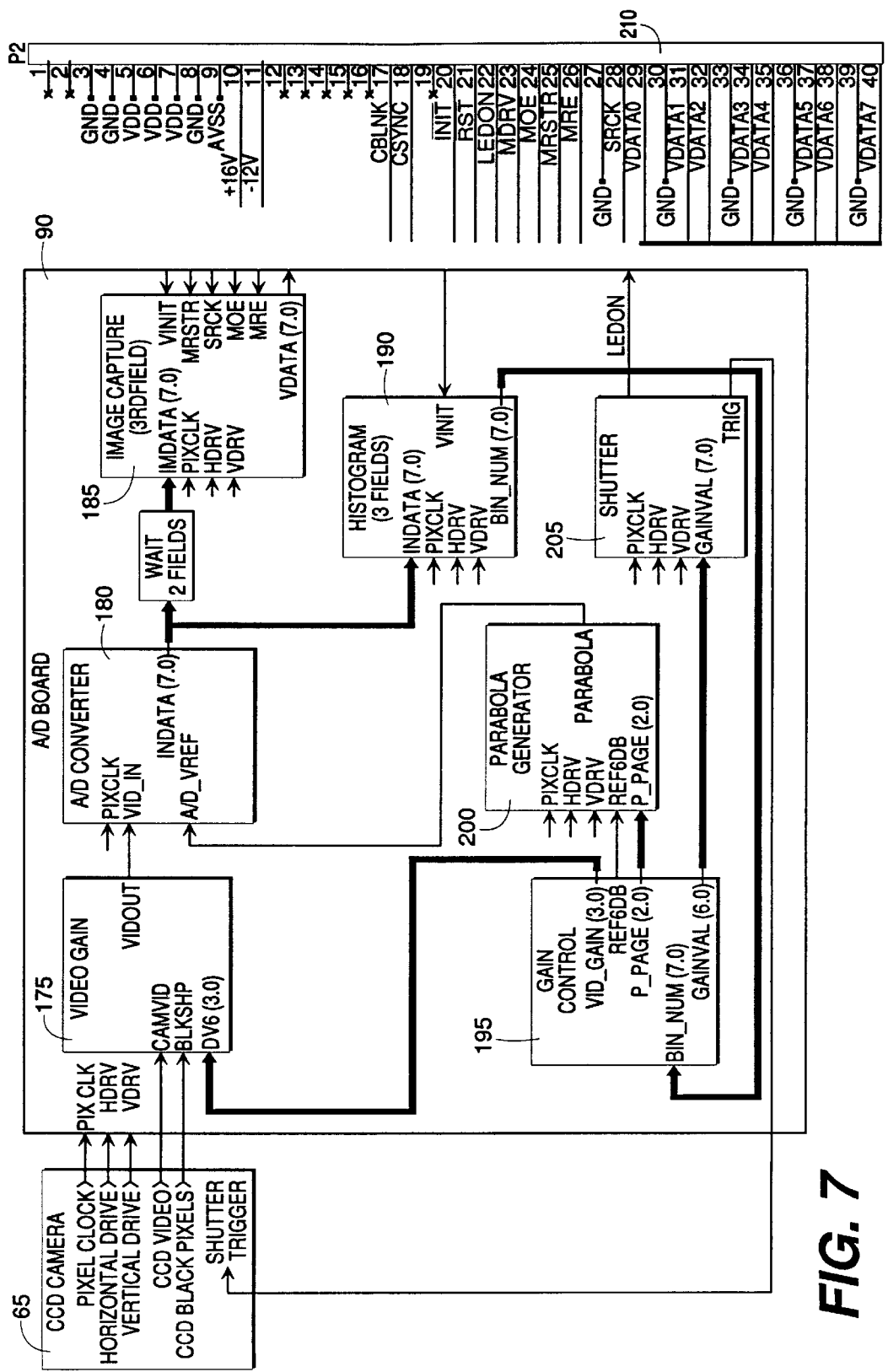
FIG. 7 is a block diagram of the circuitry employed in the analog-to-digital printed circuit board, which forms a part of the hand held label reader of FIG. 1.
Figure 8:
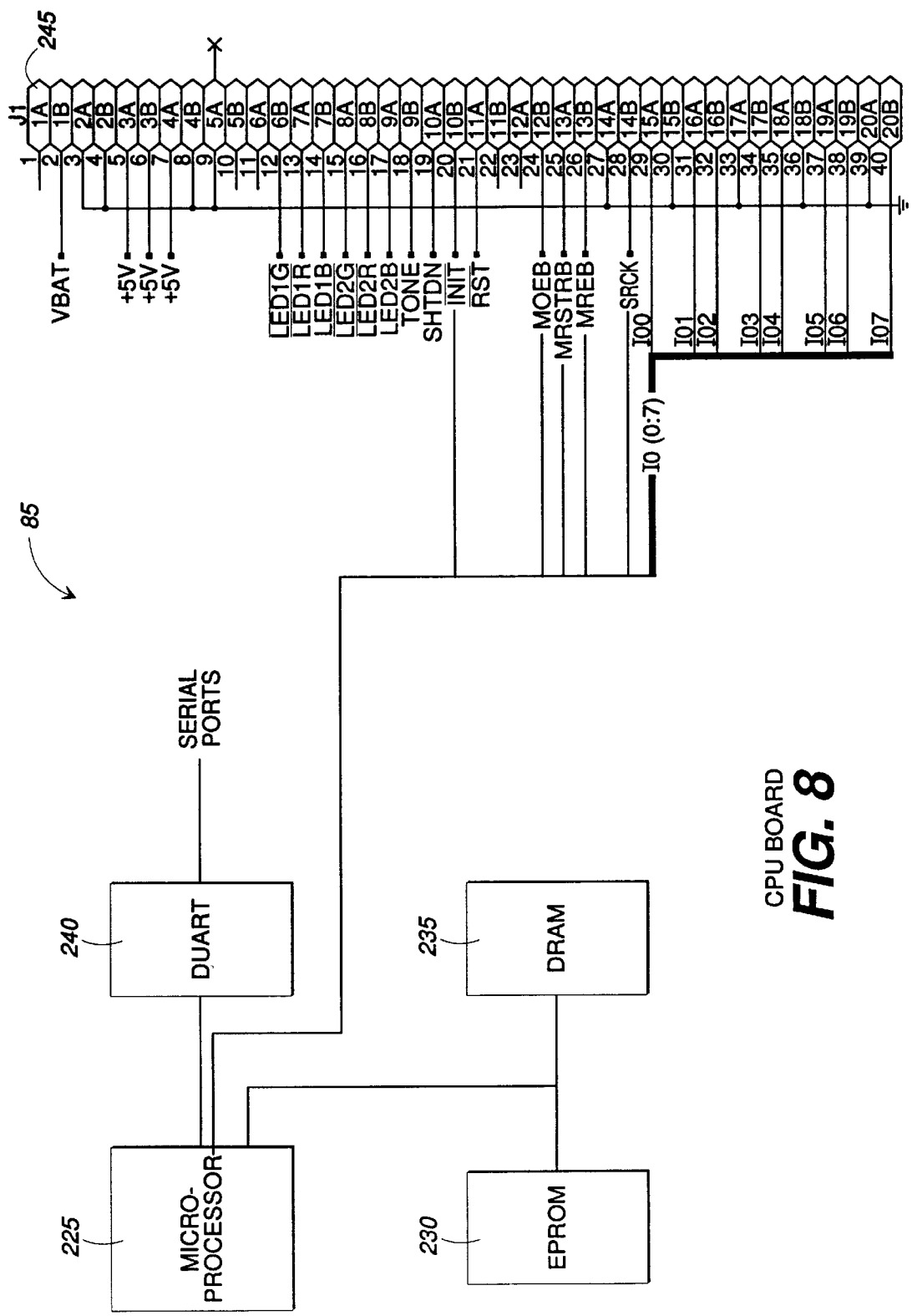
FIG. 8 is a block diagram of the circuitry employed in the CPU printed circuit board, which forms a part of the hand held label reader of FIG. 1.
Figure 9:
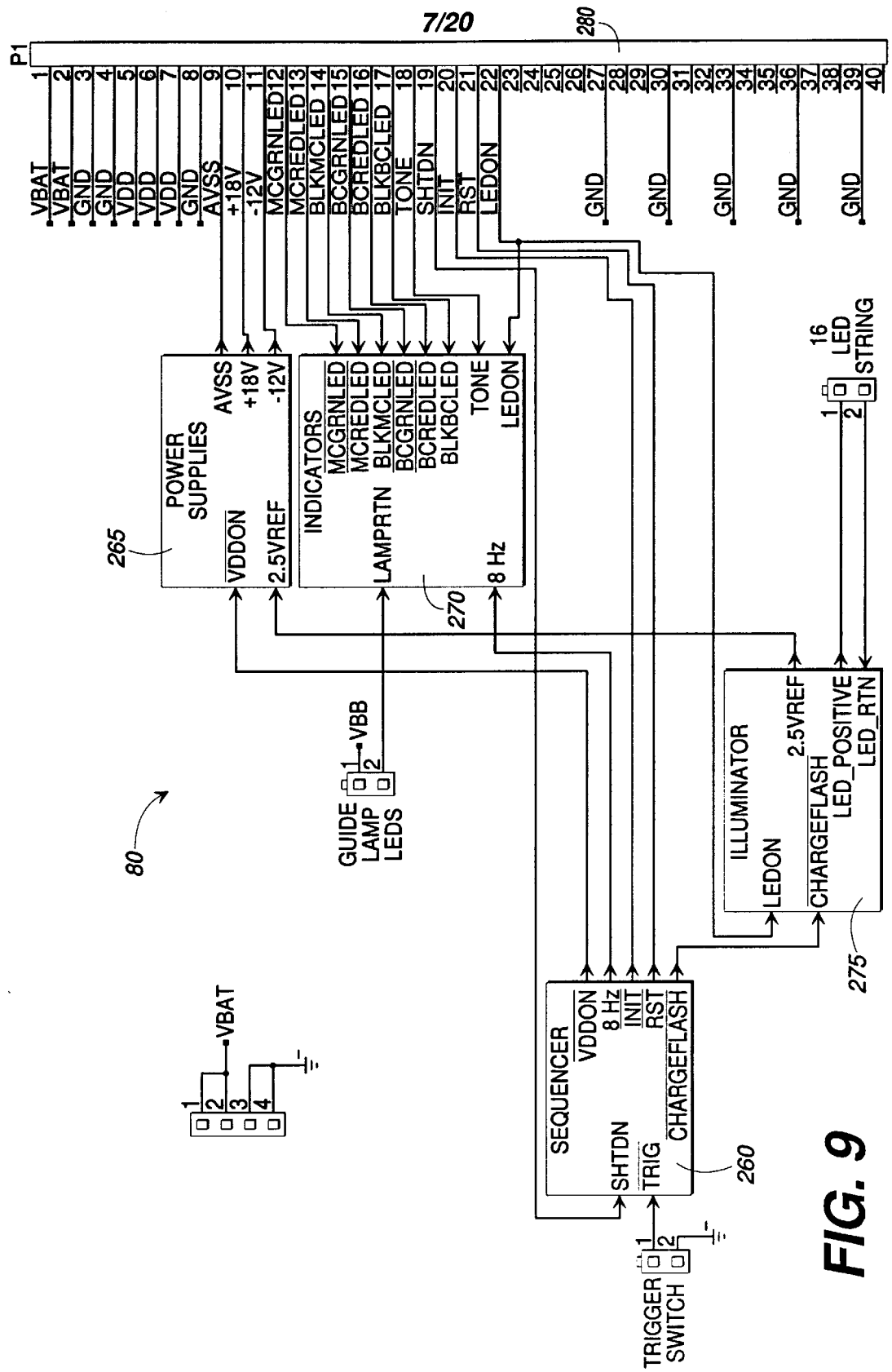
FIG. 9 is a block diagram of the circuitry employed in the control printed circuit board, which forms a part of the hand held label reader of FIG. 1.

Turning now to FIGS. 7–9, the primary components and functions of the printed circuit boards will be discussed. FIG. 7 is a block diagram of the circuitry that is included on the A/D board 90. For clarity, FIG. 7 also illustrates the camera 65 and the connection between the camera and the A/D board 90. The A/D board has two main functions. The first is to convert the analog video signal from the camera into 8 bit digital image data, and store the digital image data in video RAM. The stored digital image data is read by the microprocessor on the CPU board 85, which executes the image processing algorithms for finding and decoding label images. The second function is to control the overall gain of the video system in order to ensure that the stored digital image data has the appropriate average intensity. This is necessary in order for the decoding algorithm to be able to properly analyze and decode the digital image data.

Prior to discussing the specific components on the A/D board 90, it is helpful to provide a general description of the how the video system operates and how the overall gain of the video signal can be controlled. The camera provides an analog CCD video output signal. The CCD video output is amplified by an analog video amplifier circuit before it is digitized by an analog-to-digital (A/D) converter. The output of the A/D converter is the digital image data that is stored in the video RAM and subsequently decoded by the microprocessor.

In order for the microprocessor to properly decode the digital image data, the intensity of the digital image must be within a predetermined range. The decode algorithm may have difficulty detecting and properly decoding the image of the label code if the digital image is too bright or too dark. Therefore, the video system must be flexible enough to provide a digital image of the proper intensity regardless of the amount of light reflected by the target object (within the operating parameters of the reader). Those skilled in the art will appreciate that the camera, video amplifier circuit and A/D converter are each capable of providing some relative gain, and that the overall gain adjustment of the video system should be adequate to compensate for the range of light intensities that will be imaged by the camera. Thus, the video system in the preferred hand held label reader 10 preferably can compensate for light intensities ranging from a label that is imaged in bright sunlight to a label that is imaged in total darkness while illuminated by the self-contained illumination source.

The camera provides an analog CCD video output signal corresponding to the image that is captured by the CCD array. The captured image is analogous to a snapshot that is formed by opening a shutter for a predetermined period of time. The brightness of the image is determined by the intensity of the light striking the array and the integration time (i.e., the length of time the light is allowed to strike the CCD's photoelements). A properly exposed image is neither too bright (overexposed), nor too dark (underexposed). Therefore, it is necessary to determine the integration time (electronic shutter speed) and aperture setting (f stop) that ensure that the CCD camera is properly exposed when it captures the label image. The camera's contribution to the overall gain adjustment of the video system is determined by the electronic shutter speed and the size of the aperture.

When using the hand held label reader 10 to capture label images, there are constraints that must be considered when determining the range of settings for the shutter speed and aperture. The preferred camera is capable of shutter speeds as fast as 1/4000 second. The slowest electronic shutter speed must still be fast enough to ensure that the captured image does not blur as a result of normal amounts of movement on the part of the operator. The present inventors have determined that the shutter speed should not be slower than 1/250 second. Therefore, the preferred camera is operated at shutter speeds ranging from 1/4000 to 1/250 second.

A fixed aperture is preferred because it eliminates any moving parts associated with the camera. The size of the aperture should be small enough to ensure that the camera has an adequate depth of field to capture label images without requiring the operator to precisely determine the distance between the target label and the label reader. The fixed aperture also should be small enough to ensure that bright sunlight is attenuated sufficiently to avoid damaging the CCD array. As mentioned above, the present inventors have determined that a fixed aperture of not larger than f/5.6, in conjunction with the attenuation provided by the band pass filter and the polarizing filter, assures the imaging CCD will not be damaged by direct sunlight being focused on the CCD.

After being filtered, the dynamic range of light intensity is about 100:1 40 dB. The shutter speed, which varies from 1/250 to 1/4000 second, provides a gain adjustment ratio of 16:1 or 24 dB.

The analog CCD video output from the camera is boosted by a video amplifier circuit 175. The preferred video amplifier circuit 175 includes a type HA5024 Quad current feedback amplifier, manufactured by Harris Semiconductor. In the preferred label reader, the gain of the video amplifier circuit can be adjusted from 6 dB to 24 dB in 6 dB steps, which provides a gain adjustment range of 8:1 or 18 dB. When using the LED illuminator, the output of the CCD is about 100 millivolts (mv). The video amplifier circuit's maximum gain of 24 dB allows the camera's 100 mv output to be boosted to approximately 1.6 V.

The analog output of the video amplifier circuit 175 is provided to an analog-to-digital (A/D) converter 180, which converts each pixel of the analog video output into an 8-bit digital value. In addition to a VIDEO_IN input, the A/D converter also has a pixel clock input, a positive REFERENCE input and a negative reference input (which is grounded in the preferred reader, and therefore is not shown). The pixel clock input receives the pixel clock signal from the CCD camera. The REFERENCE signal is an analog reference signal that is used to determine the digital output value. For each pixel (as indicated by the pixel clock signal), the digital output of the A/D converter will be equal to:

OUTPUT=((VIDEO_IN)/(POS REF−NEG REF) * 255)

The transfer function of the A/D converter can be changed by adjusting the reference voltage. Thus, the A/D converter can provide a gain adjustment by adjusting its reference voltages. The nominal 2.5 V across the positive and negative converter references can be attenuated by a factor of up to 3.65:1 or 11.25 dB. At the maximum setting the converter reference differential can be reduced to 685 mv. This gives a gain margin of 1.6/.685 or 7.37 dB at the low end.

Based on the foregoing, those skilled in the art will understand that the video system provides a total gain adjustment that includes that of the shutter speed control (24 dB) plus that of the video amplifier circuit (18 dB), plus that of the A/D converter (11.25 dB), for a total of 53.25 dB (460:1), which is sufficient to compensate for the 40 dB variation in the light falling on the CCD array, while also allowing camera settings that provide sufficient depth of field and ensure that the image is not blurry The 53.25 dB gain adjustment range provided by the video system provides approximately 13 dB of extra dynamic range when compared to the anticipated variation in illumination. This extra gain is split so that the video system provides approximately 6 dB of extra dynamic range on either end of the lighting conditions. This is advantageous because it allows for tolerances of the various video system components. In addition, this feature of the present invention allows the video system to be manufactured without requiring any manual adjustment in order to operate in the proper range.

The output of the A/D converter is always directly proportional to the light intensity due to DC restoration of the signal to the converter. Black reference pixels on the CCD do not respond to light and their output voltage is used to bias the video amplifier circuit so that a zero light intensity (black) produces a video input voltage equal to the negative converter reference (i.e., 0 volts). The A/D converter's output therefore is zero. Because the output of the A/D converter is directly proportional to the light intensity, the ratio of the A/D converter output to a desired value can be used to adjust the overall video gain of the system by changing the camera's shutter speed, the video amplifier circuit's gain, and/or the A/D converter's references voltage. The particular manner in which the intensity of the image is determined and these setting are adjusted is discussed below.

As mentioned above, the CCD video output of the camera 65 is connected to the input of a video amplifier circuit 175, which amplifies the analog video output from the camera. Those skilled in the art will understand that the video amplifier circuit 175 also receives a black pixel signal from the camera. The black reference is provided in order to allow the video amplifier to be restored so that it provides an output of 0 volts when the analog video output is the black reference signal. The method by which the gain of the video amplifier circuit is controlled is discussed below.

The output of the video amplifier circuit 175 is provided to an analog-to-digital (A/D) converter 180, which converts each analog pixel to an 8-bit digital value. As mentioned above, the positive reference input of the A/D converter is varied in order to adjust the gain of the video system. This process is described more completely below.

The output of the A/D converter 180 is provided to video random access memory (RAM) 185 and a histogram circuit 190. The video RAM 185 is a dynamic RAM array of 256 Kbytes. The video RAM has one serial input port and one serial output port. The input port is connected to the output of the A/D converter 180. The output port is connected to a decode microprocessor that is located on the CPU board 85. Each port has its own data clock so that data writes and reads can be asynchronous and at different clock rates. Video RAM control circuitry (not shown) finds the third field from the camera and writes it to the video RAM. The first two fields are used to determine the shutter speed and system gain settings that are needed in order to obtain a proper exposure of the label image. This process is discussed more completely below.

The histogram circuitry 190 implements an image data histogram algorithm in order to evaluate the intensity level of the output from the A/D converter 180 and adjust the relative video gain of the system to provide a digital image having the proper intensity. The histogram circuit 190 is implemented using a variety of custom programmable logic devices, electronically programmable read only memory (EPROM) look up tables, static RAM, data buffers and latches. In the preferred hand held label reader, all of the control functions, counters, state machines, multiplexers, adders and comparators are implemented in field programmable gate arrays (FPGAs) in order to maximize the flexibility of the circuit and minimize the size of the circuit.

Generally described, the histogram circuit measures the intensity of the digitized video image by integrating a probability density function to produce a cumulative distribution function. An advantage of the histogram technique is that it minimizes the circuit's sensitivity to local dark or extremely bright areas. In the preferred hand held label reader, a properly exposed image is defined as having a predetermined percentage (90%) of a group of selectively sampled pixels of the image (shown in FIG. 15) falling at or below a predetermined gray level, preferably 75% of saturation. The actual gray level reached by the predetermined percentage of sampled pixels is compared to the desired level and the ratio of the two is used to correct the exposure/gain setting, as described in detail below in connection with FIGS. 14–20.

Thus, the preferred histogram circuit 190 measures the 8 bit gray level brightness of 255 selectively sampled points from the video image data. A bin static RAM (SRAM) provides 256 bins for storing 8 bit data. Each bin number corresponds to a gray level, and each bin holds the total number of occurrences in the sample for each gray level. After sampling the image, the contents of the bins are summed starting at address 0 (darkest gray level) of the bin SRAM, until the running sum of the bins reaches 90% of the 255 selectively sampled pixels (230 pixels). The bin number reached (BIN_NUM) is taken as an estimate of the overall image brightness level. BIN_NUM is stored and provided to gain control circuit 195.

The gain control circuit 195 uses a gain look-up table to set the new relative system gain value based on the bin number provided by the histogram circuit and the last gain value. The new gain value provides output signals that are used to control the overall gain adjustment of the system. As mentioned above, this is accomplished by adjusting the camera's electronic shutter speed, the gain of the video amplifier circuit, and the A/D converter's reference voltage. A video amplifier gain output from the gain control circuit is provided directly to the video amplifier circuit 175. An A/D converter gain output from the gain control circuit is provided to a parabola generator circuit 200, which provides an analog input signal to the A/D converter's reference voltage input. A shutter control signal from the gain control circuit is provided to a shutter control circuit 205, which provides a trigger pulse to the camera when the exposure is to begin. The details of this process are described more completely below. The A/D board 90 is connected to the CPU board 85 and control board 80 via a connector 210.

FIG. 8 is a block diagram of the circuitry located on the CPU board 85. The CPU board 85 includes a microprocessor 225, electronically programmable read only memory (EPROM) 230, random access memory (RAM) 235, serial communication circuitry 240, and a connector 245.

The preferred microprocessor 225 is a type IDT3081 RISC central processing unit (CPU), manufactured by Integrated Device Technology. The primary function of the microprocessor is to decode the digital label image data that is stored in the video RAM 185 on the A/D board. In addition, the microprocessor 155 controls the operation of indicator lamps that indicate whether the decode operation has been successful.

Because a CCD camera captures a two-dimensional image or "snapshot" and provides image data to a decoding algorithm, a label reading device employing a CCD camera is as versatile as the decode algorithms programmed in the label reader. This allows a single label reader to be used to read and decode a wide variety of bar codes and two-dimensional symbologies, provided the appropriate decoding algorithm is available. Examples of such cameras and associated methods are disclosed in U.S. Pat. Nos. 4,874,936, entitled "Hexagonal, Information Encoding Article, Process and System," 5,329,105. entitled "Method and Apparatus for Determining the Width of Elements of Bar Code Symbols," 5,308,960, entitled "Combined Camera System," and 5,276,315, entitled "Method and Apparatus for Processing Low Resolution Images of Degraded Bar Code Symbols," the disclosures of which are incorporated herein by reference. The CPU board includes 512 Kbytes of EPROM 230, which is used to store the basic operating system and the decoding software. The operating system and decode algorithms can be upgraded or modified by providing new EPROM devices.

The CPU board also includes 4 Mbytes of RAM 235, which is used to store various data associated with the decoding of the image data. Those skilled in the art will understand that the RAM 235 may be used store the image data as it is read from the video RAM 185 and to store various data that results from the decoding process.

The serial communication circuitry 240 includes a type SCN2681T dual asynchronous receive/transmit (DUART), manufactured by Signetics. The serial communication circuitry is used by the microprocessor 225 to communicate serial data between the hand held label reader and the data terminal to which it is attached.

The connector 245 is used to connect the CPU board 85 to the control board 80 and the A/D board 90 via the backplane cable.

FIG. 9 is a block diagram of the circuitry located on the control board 80. The major functions of the control board 80 are implemented in sequencer circuitry 260, power supply circuitry 265, illuminator circuitry 270, and indicator circuitry 275. The control board 80 is connected to the CPU board 85 and A/D board 90 by a connector 280.

Generally described, the sequencer circuitry 260 receives a signal from the trigger 95 and initiates the sequence of operations associated with a label read cycle. For example, upon receipt of the trigger signal, the sequencer circuitry 260 provides a signal that causes power supply circuitry 265 to switch on the power to the camera, microprocessor and other components that are powered down when the hand held label reader is in the idle state. The sequencer circuitry 260 also provides a reset signal that causes the components to be initialized as they power up. The label read cycle is described in detail below with reference to FIG. 10.

The illuminator circuitry 275 provides analog circuitry for driving the illumination light source. The A/D board provides a signal that causes the illuminator circuitry 275 to turn on the illumination light source's LEDs only when the camera is capturing an image. Thus, the illumination light source is turned on in conjunction with the triggering of the camera's electronic shutter, which is also controlled by the A/D board. By controlling the illumination light source in this manner, the illumination light source is turned on three times for each label read cycle. The first two times are for preliminary exposures that are used to adjust the video system gain. The third is to capture the image of the target label. Those skilled in the art will appreciate that turning the illumination light source off between reads prevents the LEDs from overheating and allows them to be driven with more current. In addition, the LEDs are brighter when they are cooler.

The indicator circuitry 270 provides the circuitry needed to drive the marker lamps 70 and the status indicator lamps that are mounted on the rear of the hand held label reader. The indicator circuitry 270 turns off the marker lamps when the illumination light source is turned on in order to prevent there from being bright spots in the captured image. The indicator circuitry also turns the status indicator lamps on and off according to signals received from the microprocessor. For example, one indicator lamp is used to indicate whether a one-dimensional code is decoded. The other indicates wither a two-dimensional code is decoded. Both indicator lamps glow yellow when the hand held label reader is in the idle state. The indicator lamps flash between the time the trigger is pulled and the decode process is completed. Depending on whether a one- or two-dimensional code was decoded, the corresponding indicator will turn green. The other indicator will turn red. If the decode process is unsuccessful, both indicators will turn red.

Figure 10:
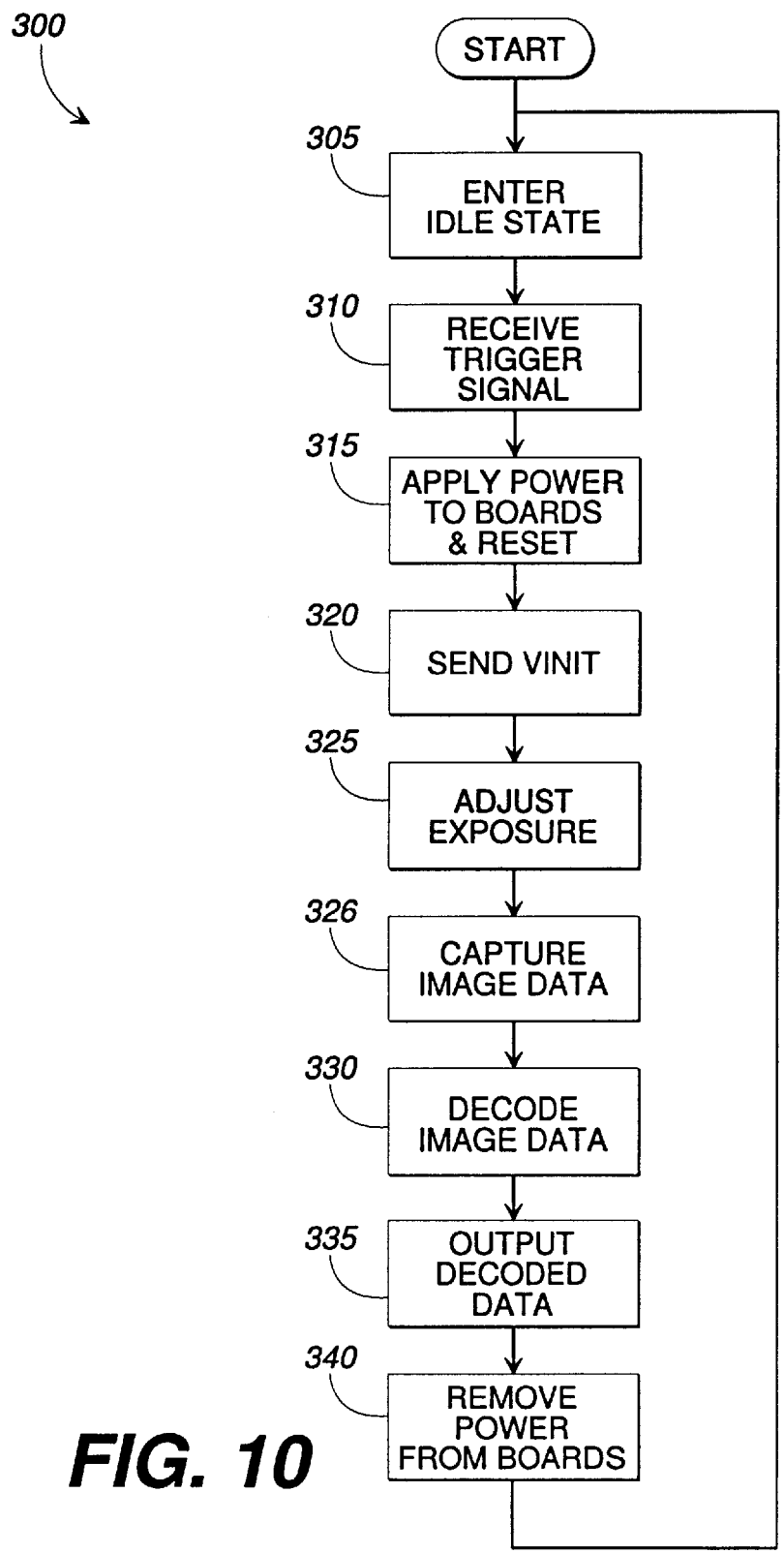
FIG. 10 is a flow chart illustrating the preferred method of operating the hand held label reader of FIG. 1 to carry out a label read cycle.

FIG. 10 is a flow diagram illustrating the algorithm employed by the hand held label reader to execute a label reading operation. The label reading algorithm 300 begins at step 305 with the hand held label reader in an idle state. At this point, the marker lamps 70 are illuminated in order to allow the user to accurately aim the reader at the target label. In order to conserve power, power is not applied to most of the components in the hand held label reader. The hand held label reader 10 remains in the idle state until step 310, when the control board 80 receives a trigger input signal from the trigger 95.

At step 315, the control board 80 applies power to all of the components in the hand held label reader, including the camera, the microprocessor 225 and the camera control circuitry that is located on the A/D board 90. When power is applied, the control board also asserts a reset signal that causes the camera, microprocessor and camera control circuitry to be initialized.

At step 320, the control board 80 provides a VINIT signal to the microprocessor and to the A/D board's camera control circuitry. The VINIT signal indicates the beginning of the process by which the label image data is captured. In the preferred hand held label reader, the VINIT signal is provided approximately 62 milliseconds (msec) after the trigger pulse is received by the trigger 95. Those skilled in the art will understand that such a delay is necessary in order to ensure that the camera has had sufficient time to power up and to begin to provide stable video output data.

At step 325, the camera adjusts the exposure in order to ensure that the intensity of the captured image is correct. This involves illuminating the target label and selecting the proper electronic shutter speed and system gain adjustment in response to the amount of reflected light received by the camera. Once the proper shutter speed and gain adjustment are determined, the target label is illuminated and the label image data is captured and stored in the video RAM at step 326. A that point, the process proceeds to step 330.

At step 330, microprocessor 225 reads the stored label image data from the video RAM 185 and decodes the label data. The decoding of the stored digital image data is accomplished by applying a stored decoding algorithm to the digital image data. Those skilled in the art will appreciate that the decoding algorithm must be designed for the particular information indicia captured by the CCD camera. Therefore, if the label reader is to be used to read bar codes, the appropriate bar code decoding algorithm must be stored in the microprocessor's EPROM 230. Likewise, if the data terminal will be used in conjunction with packages bearing two-dimensional symbologies, the appropriate decoding algorithm must be provided in the decoder. Those skilled in the art will appreciate that the information indicia captured by the CCD camera are not limited to bar codes and two-dimensional symbologies, but may also include printed or hand-written text that is readable by optical character recognition (OCR) techniques. It is possible to provide a plurality of decoding algorithms so that the data terminal can be used to read and decode any of a wide variety of various information indicia.

Those skilled in the art will also appreciate that several steps may be required to decode the digital image data. For example, the decode algorithm will first need to determine whether the captured image includes a recognizable type of information indicia. If so, the algorithm may need to determine the-orientation of the information indicia, and, if necessary, rotate the data to align the information indicia with a desired axis. After all the necessary steps are accomplished and the digital image data is decoded, the decoded data is stored in random access memory (RAM) on the CPU board 85.

At step 335, the microprocessor 225 transmits the decoded label data to the attached data terminal equipment. The decoded data is transmitted as serial data via one of the serial ports. In the preferred hand held label reader, the serial data is provided to the attached data terminal via the reader cable 40.

At step 340, the sequencer circuitry 260 on the control board 80 removes power from the switchable components, and the hand held label reader returns to the idle state. In the preferred hand held label reader, the power is removed when the control board receives a signal from the CPU board indicating that the decode process is complete. If, for some reason, the microprocessor fails to provide such a signal, the control board circuitry will automatically remove power from the other components approximately 8 seconds after the receipt of the signal from the trigger. This time out ensures that the hand held reader will return to the idle state even if the microprocessor crashes for some reason.

Figure 11:
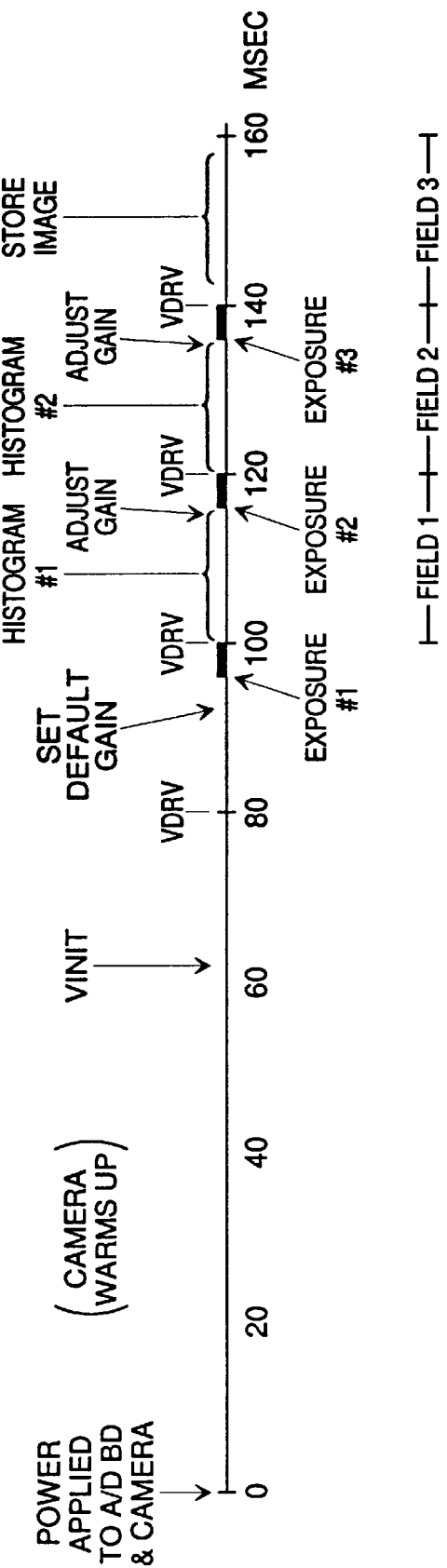
FIG. 11 is a timing diagram illustrating a sequence of events associated with a capturing a label image.

Turning now to FIG. 11, the preferred method for capturing image data will be described. The process of capturing image data forms a step 325 in the method of FIG. 10.

FIG. 11 is a timing diagram illustrating the general sequence of events by which label image data is captured. The horizontal scale reflects a period of time from 0 to 160 msec. Those skilled in the art will understand that the CCIR format camera employed in the present invention provides one video field every 20 msec. Therefore, the timing diagram is marked off in 20 msec increments.

The timing diagram begins by showing that power is applied to the camera and the A/D board shortly after the trigger signal is received at approximately 0 msec. As described above in conjunction with FIG. 10, a label read cycle begins when the operator squeezes the hand held label reader's trigger. At that point, circuitry on the control board applies power to the microprocessor, camera, and to the other components on the A/D board.

At approximately 62 msec, the control board initiates the image capture sequence by providing a VINIT signal to the histogram circuit 190. The period of time between the trigger signal and the VINIT signal is sufficient to allow the camera to warm up and to begin to provide a good, stable video output signal.

After the A/D board receives the VINIT signal from the control board, the A/D board waits for the next VDRV signal from the camera. As described above, the VDRV signal indicates the beginning of a new video field. The CCD array is exposed to light during a period of time corresponding to the electronic shutter speed. As will be explained in more detail below, the majority of the exposure time occurs prior to the VDRV signal. Shortly after the VDRV signal occurs, an internal transfer clock signal causes the charge that has built up in the CCD array's photoelements to be transferred to the CCD registers. From there, the image is clocked out of the CCD registers one pixel at a time to provide the CCD video output signal.

After the first VDRV following the VINIT signal, the A/D board circuitry sets the video system gain adjustment to a predetermined default setting, which is used to take a test exposure. The desired system gain setting includes a shutter speed, video amplifier gain, and A/D reference input.

Between approximately 96 and 100 msec, the camera's photoelements are exposed for the default integration period. Shortly after the VDRV signal at 100 msec, the camera outputs the analog pixel data that forms a first video field. As the data is provided by the camera, the A/D board's histogram circuitry 190 determines the intensity of the field 1 image. The output of the histogram circuitry is used by the gain circuitry 195 to adjust the gain settings prior to the second exposure, which begins between approximately 116 and 120 msec. The algorithm applied by the histogram circuitry 195 is described in more detail below.

After the VDRV signal at 120 msec, the camera outputs the analog pixel data that forms a second video field. The A/D board's histogram circuitry analyzes this data as it is provided by the camera. The output of the histogram circuitry Is used to adjust the video system gain prior to the third exposure, which begins between approximately 136 and 140 msec.

After the VDRV signal at 140 msec, the camera outputs the analog pixel data that forms a third video field. As the CCD video output signal is clocked out of the camera and digitized by the A/D converter, the digital image data is stored in the video RAM. As described above in conjunction with FIG. 10, the stored video image data will be read and decoded by the microprocessor, which is located on the CPU board. In the preferred hand held reader, the microprocessor does not complete its initialization and boot up procedures until after the digital data is stored in the video RAM (at approximately 160 msec). Therefore, the digital image data is available in the video RAM as soon as the microprocessor is ready to read it.

As previously discussed, the overall gain adjustment of the video system is preferably sufficient to compensate for the dynamic range of reflected light when the hand held label reader is used in various environments. In addition, the camera's aperture and shutter speed must be constrained to ensure that the captured image is not blurry due to a shutter speed that is too slow or a depth of field that is too shallow. In the preferred system, the components in the video system can provide an total gain adjustment of up to 53.25 dB. This total includes 24 dB of gain adjustment associated with varying the camera's shutter speed, 18 dB from adjusting the video amplifier circuit, and 11.25 dB from adjusting the A/D converter.

In the preferred hand held label reader, the overall video gain is adjusted in steps of 0.75 dB. The gain is determined by a gain look up table that forms a part of the gain control circuitry 195 on the A/D board. The gain values that are implemented in the gain look up table are illustrated in FIG. 12. The gain look up table provides 72 discrete gain control values (0–71), which correspond to gain adjustments ranging from 0 to 53.25 dB in 0.75 dB steps.

Each gain control value corresponds to a predetermined setting for the shutter speed, video amplifier gain and A/D converter reference voltage. For example, the maximum gain control value of 71, which would be used in the darkest lighting conditions, requires a shutter speed of $\frac{1}{250}$ second. The present inventors have determined that this is the slowest shutter speed that can be used without undue risk of a blurry image. A gain control value of 71 also provides a video amplifier gain adjustment of 18 dB, which is the maximum gain adjustment provided by the preferred video amplifier circuit. The A/D converter's reference signal will also be set so that the A/D converter provides its maximum relative gain during the process of converting the analog video signal to a digital signal.

Figure 13:
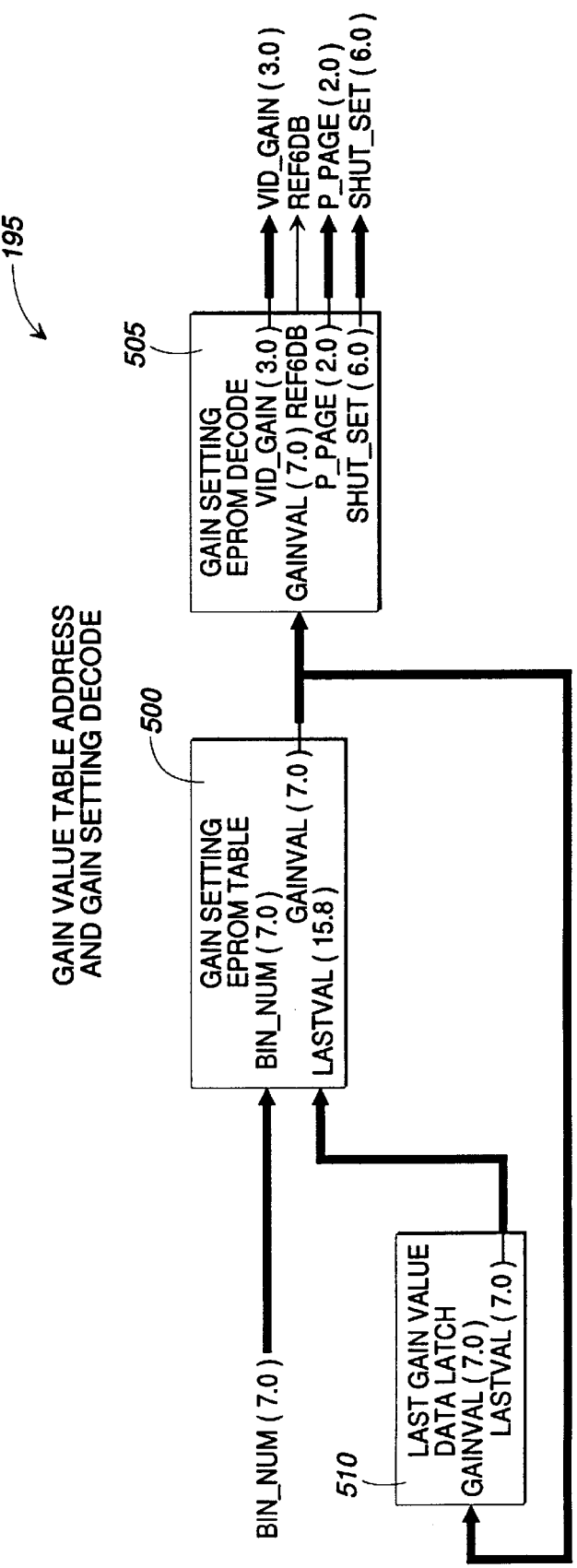
FIG. 13 is a block diagram of circuitry employed in the gain control circuit of FIG. 7.

The principal elements of the gain control circuit 195 are illustrated in FIG. 13. Those skilled in the art will understand that the gain control values stored in the gain look up table must be decoded to provide the appropriate input signals for the camera, video amplifier circuit and A/D converter. The preferred gain control circuit 195 employs an EPROM 500 to store the gain control value look up table, which is responsive to the previous gain control value and the bin number provided by the histogram circuitry 190 in the manner described below. The output of the EPROM 500 is provided to a decoder 505, which forms a part of a field programmable gate array. The decoder 505 decodes the gain control value and provide signals that are used to adjust the system gain. A VIDEO_GAIN signal is provided directly to the video amplifier circuit 175. A shutter setting is provided to the shutter control circuitry 205, where it is used to provide a shutter trigger pulse to the camera. A parabola page signal and REF 6 dB signal are provided to the parabola generator circuit, where they are used to control the video reference signal to the A/D converter. Those skilled the art will appreciate that, in an alternative embodiment, a parabola correction function could be applied to the video amplifier circuit 175, or to both the A/D converter and to the video amplifier circuit. The functions of the shutter control circuitry and the parabola generator circuitry are described more completely below.

The gain look up table initially selects a default gain control value of 32, which is used for the exposure that begins at approximately 96 msec (see FIG. 11). As illustrated in FIG. 12, a gain control value of 32 corresponds to a video system gain adjustment of 24 dB. As discussed above, the output of the A/D converter is directly proportional to the light intensity. This allows the gain look up table to rely on the ratio of the converter output to a desired value to adjust the overall video gain of the system. The particular manner in which the amount of light is determined and these setting are adjusted is discussed below.

After the histogram analysis is applied to the first video field (which was captured using the default gain adjustment settings), the gain look up table selects the gain control value for the second video field based on the light intensity as indicated by the output of the A/D converter. The light intensity is represented by a bin value (BIN_NUM), which is provided by the histogram circuitry.

The gain look up table sets the next gain control value based on the previous gain control value and the bin value from the most recent histogram. The previous gain value is provided to the EPROM 500 by a data latch 510. The gain control values are selected to drive the signal processing so that 90% of the pixel gray levels (i.e., 230 of 255 pixels) in the image area fall below approximately 75% (190) of the saturation value (255). This equation by which this is accomplished is:

NEXT VALUE=LAST VALUE+4/3*20 LOG (190/BIN_NUM)

If the image from the first field is saturated (i.e., the image is too bright; BIN_NUM=255), the second field is exposed at a second default gain control value of 8, which represents a video system gain adjustment of 6 dB. In most cases the jump from the default control value to the correct gain control value can be accomplished in one correction. However, in the case of bright light conditions where the CCD is saturated, two adjustments are needed. Therefore, the preferred hand held label reader is designed to arrive at the correct exposure over three fields of video.

Figure 14:
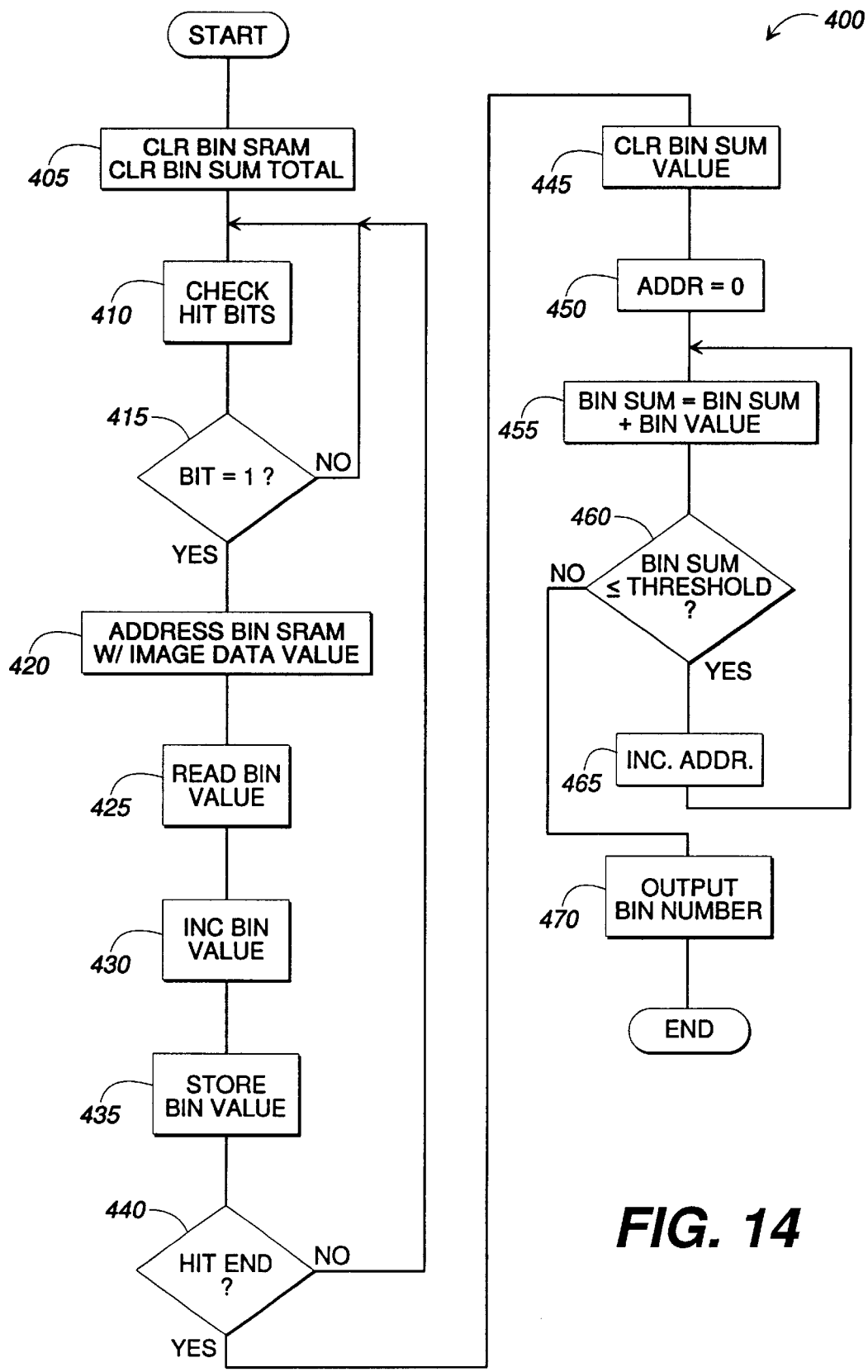
FIG. 14 is a flow chart illustrating the preferred histogram method for analyzing the intensity or a digital image.

FIG. 14 is a flow diagram illustrating the preferred method 400 for performing the histogram analysis, which is carried out by the histogram circuitry 190. As described above, the histogram function integrates the probability density function of the pixel intensity to produce a cumulative distribution function. The hardware used in the histogram circuitry includes custom programmable logic, EPROM look up tables, static RAM, data buffers and latches. All of the control functions, counters state machines, multiplexers, adders and comparators are implemented in field programmable gate arrays in order to maximize flexibility and minimize board space.

The preferred method 400 begins at step 405 by clearing the bin SRAM, which is used to store the number of occurrences of each light intensity value. At step 405, the variable BIN_SUM_TOTAL, which is used to sum the stored bin values, is also cleared.

Figure 15:
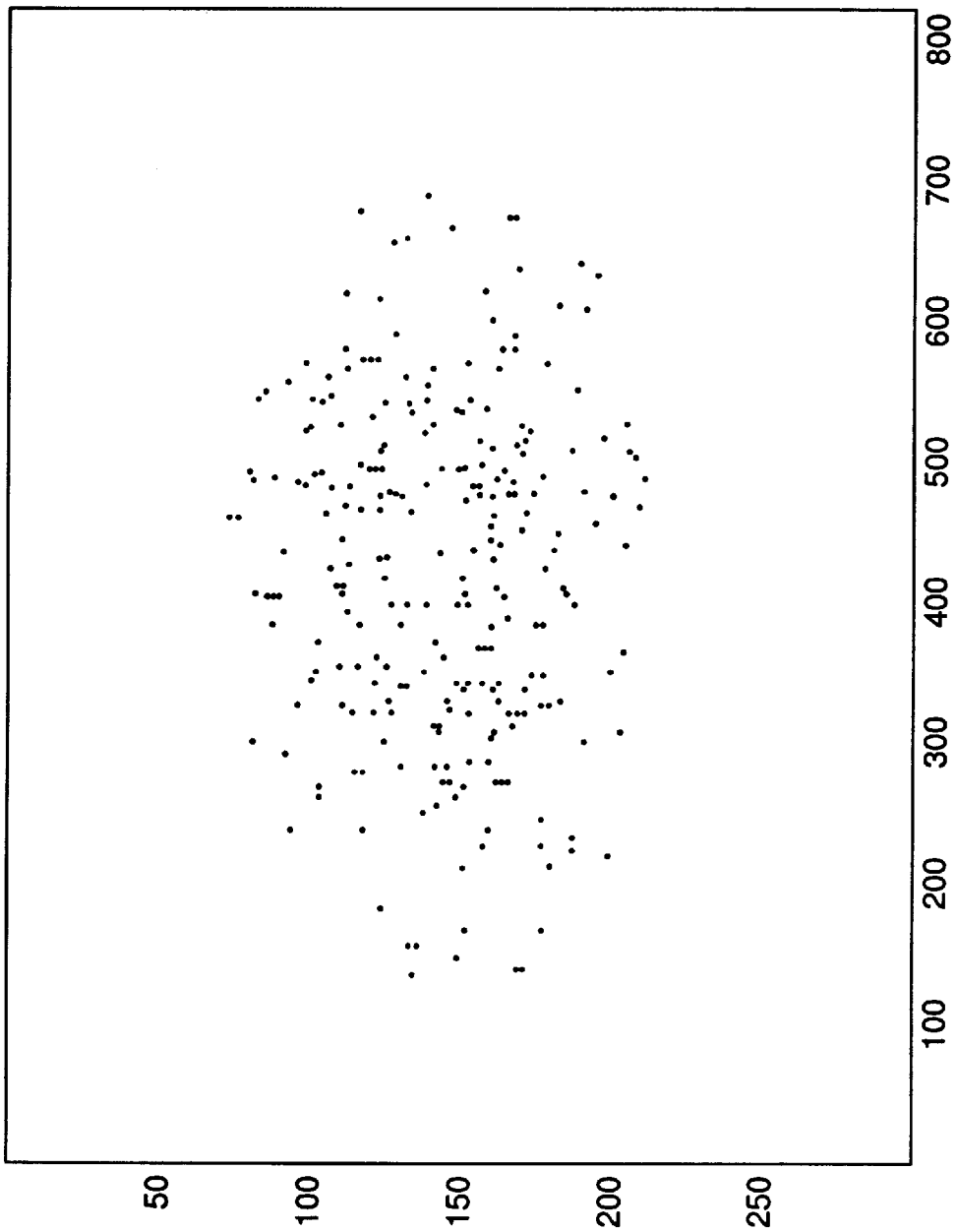
FIG. 15 is a diagram illustrating the type of pattern used to sample bits in the preferred histogram method of FIG. 14.

The histogram process samples 255 preselected pixels in order to determine the intensity of the image. The pixels that are selected to be analyzed form a semi-random pattern similar to a shotgun pattern, in which the heaviest concentration being near the center of the image. A shotgun type pattern of the type used in the histogram process is illustrated in FIG. 15. In the preferred hand held label reader, the selected pixels are located in the middle third of the image.

The preselected pixels are identified by HIT BITS that are stored in a HIT TABLE in an EPROM. The HIT TABLE include one bit for each of the pixels of a video field. The preselected bits are indicated by storing a 1 in that bit in the HIT TABLE. The other bits, which are ignored by the histogram process, are represented in the HIT TABLE by 0. As each pixel is clocked out of the camera, the histogram circuit checks the corresponding HIT BIT to see if it is a 1. This process is indicated at steps 410 and 415. If the HIT BIT is a 0, the method returns to step 410 and waits for the next pixel to be clocked out of the camera.

If the HIT BIT is a 1, the method proceeds to step 420 where the image data byte from the A/D converter is used to address the corresponding bin number in the bin SRAM. At steps 425 the method reads the value that is presently stored in that bin. At step 430, the value is incremented by one. At step 435, the new value is stored back in the bin.

At step 440, the method determines whether all of the 255 preselected pixels have been sampled. In the preferred histogram circuitry, this is accomplished by counting the number of HDRV signals that have occurred since the last VDRV signal and generating a HIT_END signal when the line includes the last HIT BIT. Thus, the method keeps track of the video line for which it is receiving data, and determines when all of the HIT BITS have been examined. Alternatively, the histogram circuit could keep track of the number of HIT BITs that have been encountered. Those skilled in the art will appreciate that the bits examined by the preferred method all occur prior to a point ⅔ of the way through the video image. This is done in order to allow time for the histogram process to be completed and the new gain control value to be selected in time to trigger the electronic shutter for the next field. Thus, in field 1 of FIG. 11, the first histogram process must be completed by approximately 95 msec, in order to allow time to trigger the electronic shutter, which may be done as early as approximately 96 msec.

If, at step 440, the method determines that all of the preselected pixels have not been sampled, the method returns to step 410. If all of the preselected pixels have been analyzed, the method proceeds to step 445, and clears the BIN SUM value, which is used to sum the values of the bin registers.

At step 450, the method sets the bin SRAM address pointer to 00. At step 455, the method reads the value in bin SRAM address 00, and adds it to the BIN SUM. At step 460, the method determines whether the BIN SUM is less than or equal to the predetermined threshold of 90% of the 255 preselected sample pixels (230 pixels). If so, the method proceeds to step 465, where the address pointer is incremented by 1. From step 465, the method returns to step 455. By repeating steps 455, 460 and 465 the method sums the values that are stored in the bin SRAM registers.

When, at step 460, the method determines that the BIN SUM is greater than threshold value, the method proceeds to step 470. The value of BIN_NUM is provided to the gain control circuitry, where it is used to address the gain look up table.

Figure 16:
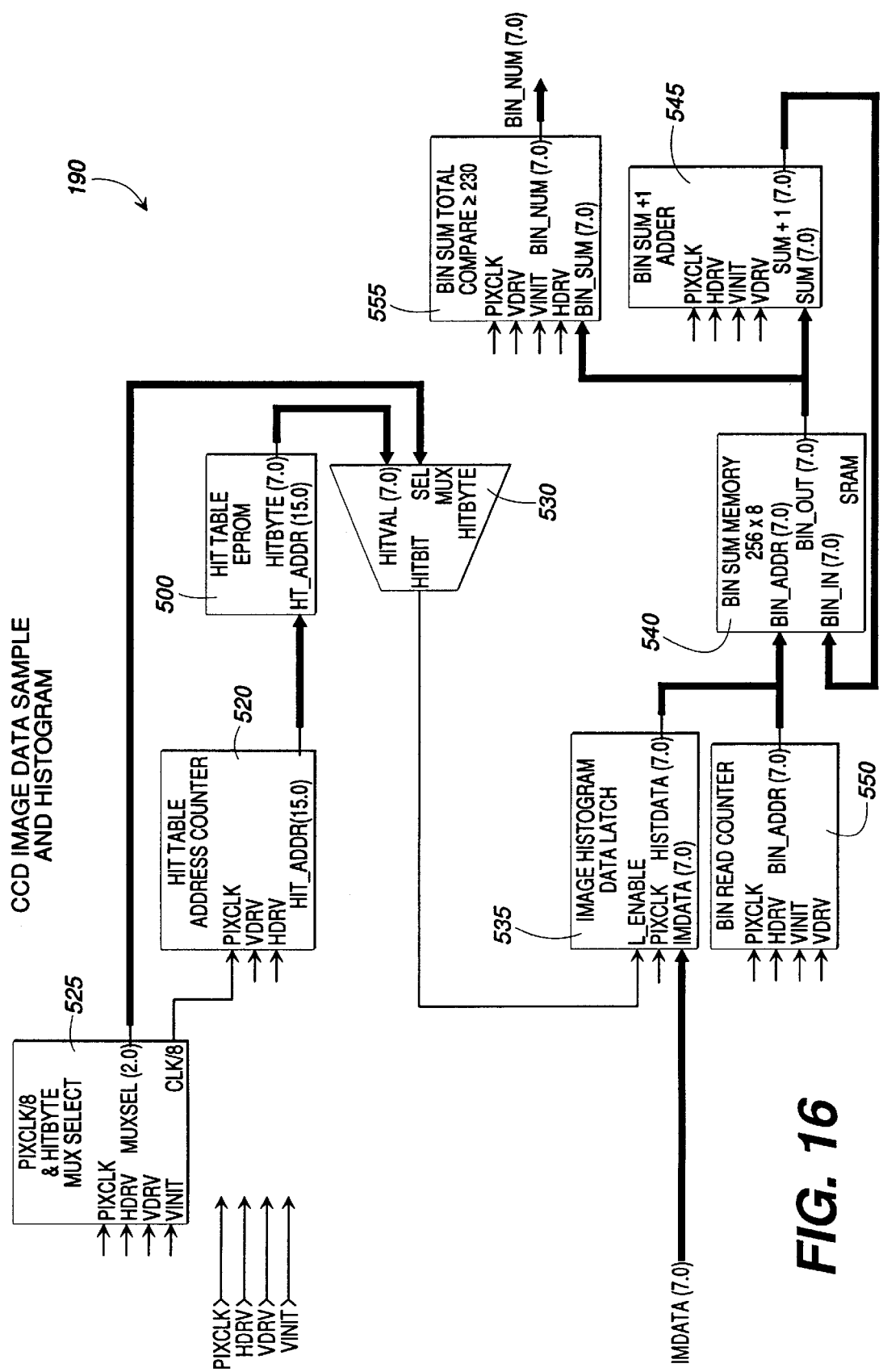
FIG. 16 is a block diagram of circuitry employed in the histogram circuit of FIG. 7.

FIG. 16 illustrates the principal elements of the histogram circuit 190, which implements the method 400 of FIG. 14. As mentioned above, the histogram circuit includes custom programmable logic, EPROM look up tables, static RAM, data buffers and latches. All of the control functions, counters state machines, multiplexers, adders and comparators are implemented in field programmable gate arrays in order to maximize flexibility and minimize board space.

The HIT TABLE is stored in EPROM 500, which in the preferred hand held label reader, also includes the gain control value look up table (see FIG. 13). The EPROM address is provided by a counter 520, which is driven by a divider 525. The counter 520 is driven by a clock that is equal to the pixel clock divided by 8. Thus, the EPROM provides a new byte (8 bits) for every 8 pixels. The divider 525 also controls a multiplexer 530, which outputs a single HIT BIT (of the 8 bits) for each pixel.

A data latch 535 receives the HIT BIT from the multiplexer 530 and the digital image data from the A/D converter 180. When the HIT BIT is a 1, the digital image value is latched into the data latch 535, and used to address the bin SRAM 540. The output of the bin SRAM, which is the value stored in the addressed memory location, is incremented by an adder 545. The incremented value is stored back in the bin SRAM 540.

When all of the HIT BITs are processed, the summing process, which leads to the output of the BIN_NUM value, is carried out by a counter 550 and summer/comparator 555. The counter 550 begins at address 00, and sequentially addresses the bin SRAM memory. The output of each address is provided to the summer/comparator 555, which determines when the sum of the bins is greater or equal to a predetermined value. When that occurs, the comparator outputs the BIN_NUM, which is used by the gain control circuit 195.

Figure 17A:
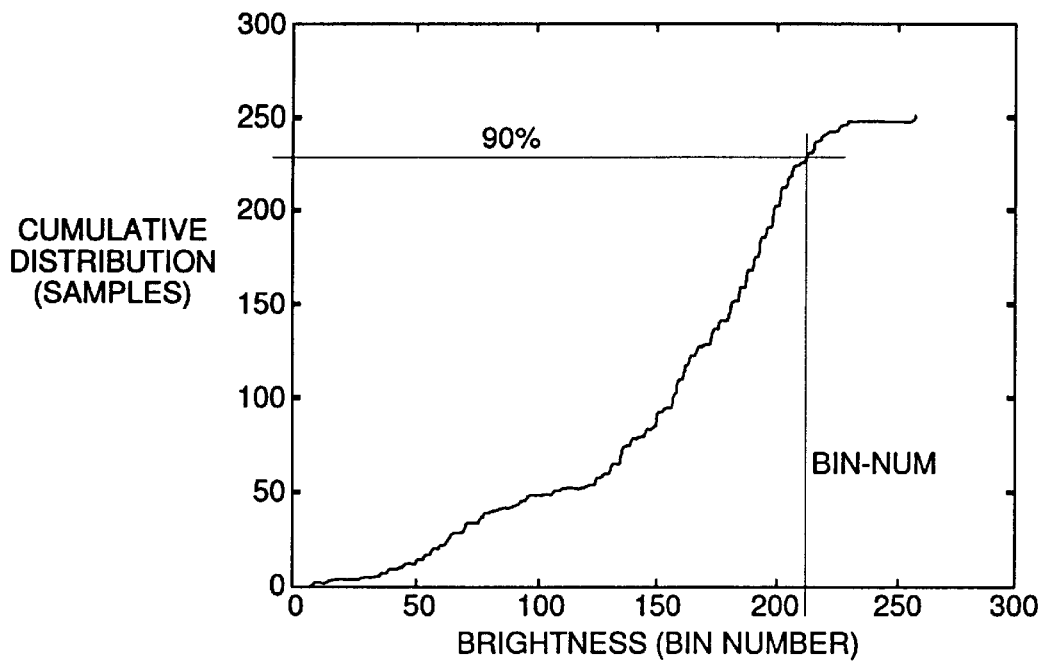
FIGS. 17a and 17b illustrate the cumulative distribution and probability density, respectively, determined by the histogram algorithm.
Figure 17B:
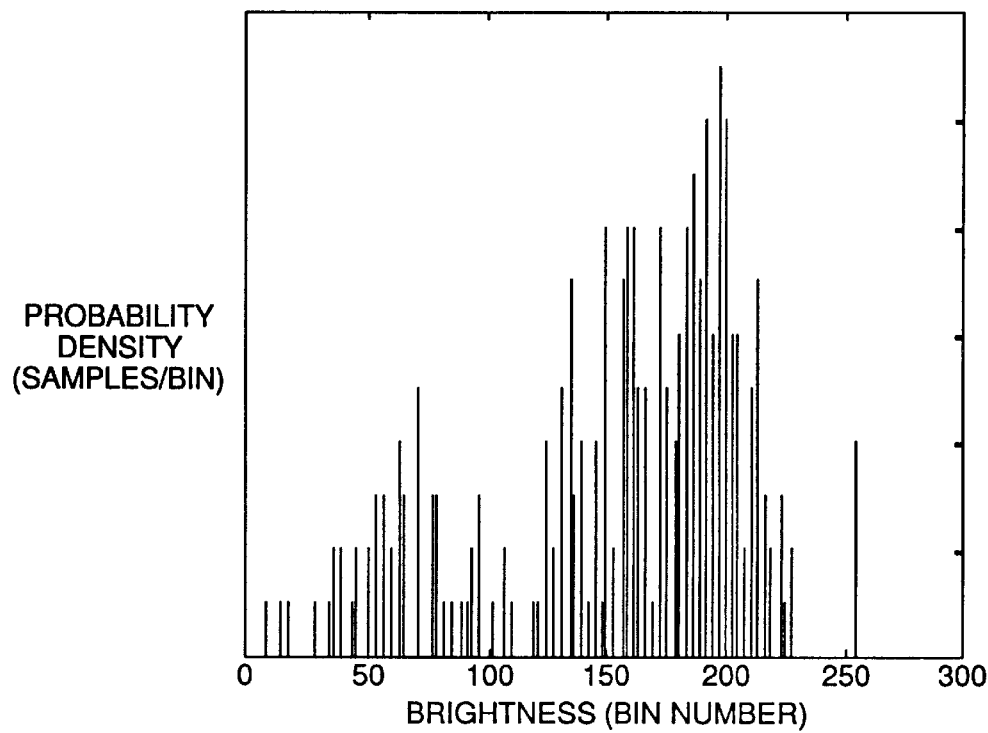

FIGS. 17*a* and 17*b* illustrate the results of the preferred histogram function when applied to a sample label, which was imaged using the initial gain control value of 32. FIG. 17*b* illustrates the probability density (samples per bin) versus the brightness (bin number). FIG. 17*a* illustrates the cumulative distribution (cumulative number of samples) versus the brightness (bin number).

The probability density (FIG. 17*b*) is the result of carrying out steps 405 through 440 of the method of FIG. 14, and indicates the number of sampled pixels at each discrete intensity level. Thus, in the example of FIG. 17*b*, it appears that most of the sampled pixels appear to have a brightness level ranging from 150 to 200. This indicates that the image was fairly bright.

The cumulative density (FIG. 17*a*) is the result of carrying out steps 445 through 470 of the method of FIG. 14. The cumulative density, which is obtained by integrating the probability density, indicates the total number of samples summed as the bins are summed sequentially beginning at bin 0.

FIG. 17*a* also illustrates the BIN_NUM, which is the output of the histogram circuit. As described above the BIN_NUM output is the bin number that corresponds with a cumulative distribution of 230 samples. Thus, the BIN_NUM output would be approximately 210. This indicates that the captured image is brighter than the desired intensity of 190.

The gain control circuit would use the BIN_NUM value of 210 and the previous gain control value of 32 to determine the gain control value to be applied to the next image. According to the equation described above in conjunction with FIG. 13:

Next Gain Control Value=32+(4/3*20 LOG 190/210)=31.

The ratio of the desired intensity level (190) to the actual intensity level (210) indicates that the gain needs to be adjusted by approximately −0.87 dB. When multiplied by 4/3, this corresponds to a change of −1.16 for the gain control value, which varies in steps of 0.75 dB. Thus, the gain control value applied to the next image will be 31.

Figure 18:
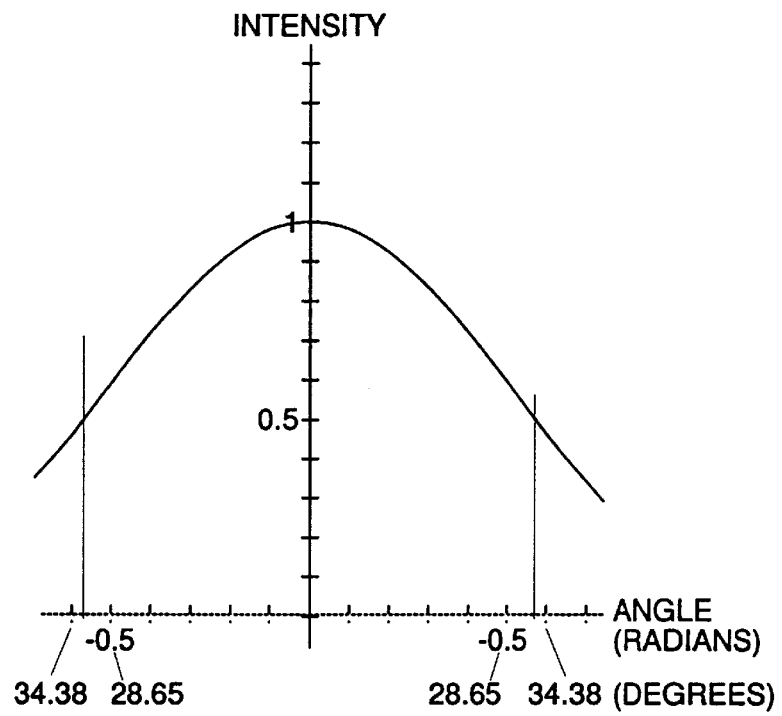
FIG. 18 is a graph illustrating the attenuation caused by the lens assembly's falloff effect.

The image function falling on the CCD can be described as the product of two functions. One is the contrast function of the object that is being illuminated and imaged. The other is the combined effect of the lens and illumination. As described earlier, the camera's lens assembly 120 causes the intensity of the image formed by the lens assembly to fall off by a factor of approximately $\cos^4(\theta)$ even when the object is perfectly illuminated. Therefore, at the corners of an evenly illuminated image, where $\theta=32°$, the image intensity is approximately 52% of the intensity at the center of the image. This function is illustrated in FIG. 18. As described above, the illumination provided by the illumination light source 75 is fairly even, therefore the undesirable function is dominated by the lens falloff effect.

The attenuation caused by the lens assembly is undesirable and can be corrected by using a close approximation of the falloff function to adjust the relative gain of the video A/D converter 180. This is accomplished by adjusting the A/D converter's reference voltage. By increasing the A/D converter gain in a manner that corresponds to the amount of attenuation experienced by each pixel, the A/D converter compensates for the fact that the pixels are darker as they get farther away from the center of the image.

Those skilled in the art will understand that the falloff function of $\cos^4(\theta)$ is bright in the center of the image, and falls off fairly uniformly as you move away from the center toward the edges. Thus, the falloff compensation function can be very closely approximated as the sum of two parabolas, where one parabola is applied once per field to correct in the vertical direction, the other is applied once per video line to correct in the horizontal direction. As a result, the output of the digitization process is a digital image whose contrast is nearly constant over the entire field of view.

Figure 19:
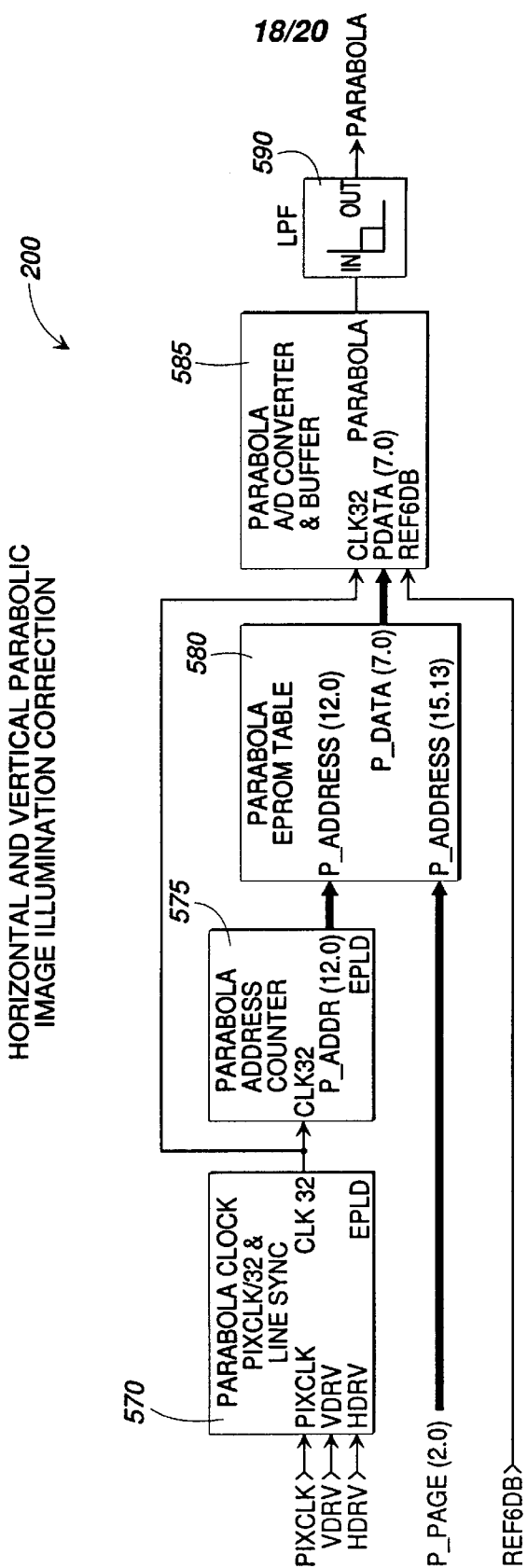
FIG. 19 is a block diagram of circuitry employed in the parabola generator circuit of FIG. 7.

The principal elements of the parabola generator circuitry 200 on the A/D board are illustrated in FIG. 19. The parabola generator circuit employs a clock circuit 570, address counter 575, EPROM 580, digital-to-analog (D/A) converter 585 and low pass filter 590. The EPROM stores 8 parabola wave forms in 8 "pages". Each page is used to provide a different average gain adjustment for the A/D converter. Those skilled in the art will appreciate that the shapes of the wave forms in the different pages are virtually identical. However, the values are scaled to provide different average gain adjustments.

The clock circuit 570 divides the pixel clock by 32, and resynchronizes with each HDRV signal. The output of the clock circuit is provided to the counter 575, which forms the address for the look up table in the EPROM 580. Thus, each value from the EPROM is applied to 32 pixels. The EPROM page is selected by a page signal (P_PAGE) from the gain control circuit. From the table in FIG. 12, those skilled in the art will appreciate that the parabola page selection is determined by the gain control value and provides the finest component of the overall gain adjustment. Each of the 8 pages is represented by one of 8 relative gain values (e.g., 0.00, 0.75, 1.50, . . . , 5.25), which repeat throughout the lookup table.

The output of the EPROM is provided to the D/A converter 585, which converts the digital value from the EPROM into an analog value. The analog output may be increased by 6 dB depending on the state of the REF 6 dB signal from the gain control circuit. When the 6 dB signal is active, it reduces the output of the D/A converter by 6 dB, thereby increasing the output of the A/D converter by 6 dB.

The output of the D/A converter is passed through the low pass filter 590, which smoothes the signal and provides an accurate approximation of the parabola function. The preferred low pass filter 590 is a Bessel low pass filter with a cutoff frequency of approximately 50 kHz. A Bessel filter is used because of its smooth frequency rolloff and flat delay over frequency.

Figure 20:
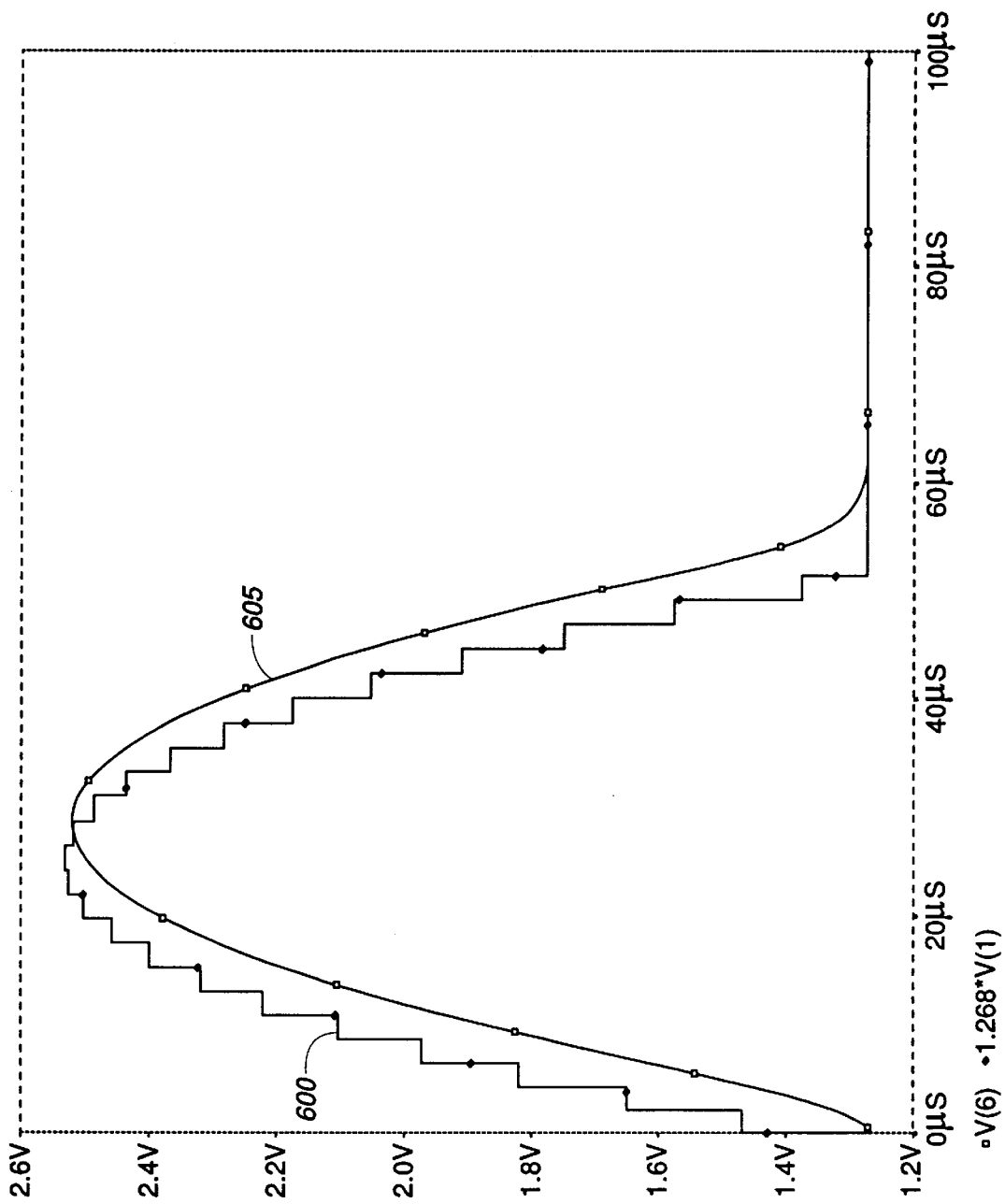
FIG. 20 is a diagram illustrating the relationship between signals produced by the parabola generator circuit.

FIG. 20 illustrates the relationship between the output 600 of the digital-to-analog (D/A) converter 585 and the output 605 of the low pass filter 590. The curve illustrated in FIG. 20 represents the portion of a function that is applied to one horizontal line of the CCD video output. The process may be summarized as using the output of the EPROM to generate a stair step function that generally looks like a parabola. The low pass filter then smoothes off the corners to provide a suitable curve function, which is applied to the REFERENCE input of the A/D converter. The values stored in the EPROM's look up table are generated by using a computer to generate and sample the desired parabola waveforms, and to model the delay through the low pass filter. The present inventors have determined that the desired waveforms can be represented by providing one look up table value per 32 pixels. This is advantageous because it allows the parabola generation circuit to provide a generally parabola-shaped output while also conserving memory.

Figure 21:
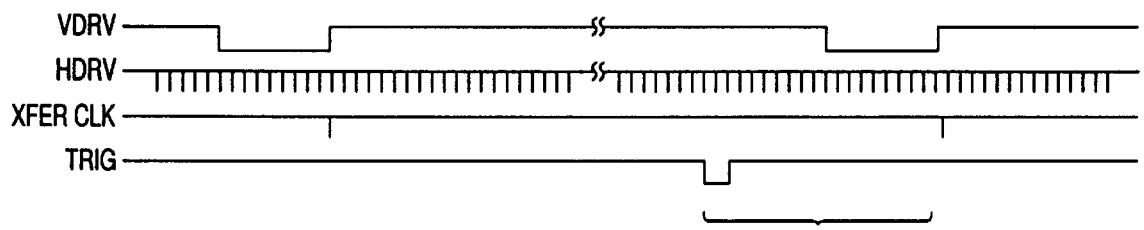
FIG. 21 is a timing diagram illustrating the relationship between the shutter speed, trigger signal and transfer clock.

The shutter control circuitry 205 uses the shutter setting from the gain control circuit 195 to provide a shutter trigger pulse to the camera. The relationship between the trigger pulse, shutter speed, and other camera signals is illustrated in FIG. 21.

As described earlier, the VDRV signals each indicate the beginning of a new video field. The HDRV signals each indicate the beginning of a new line. Shortly after each VDRV signal, the accumulated pixel charge is transferred from the CCD photoelements to the corresponding registers. From the registers, the pixel values are clocked out of the camera as analog CCD video data. The transfer clock signal (XFER CLK) indicates when the charge is transferred from the photoelements to the registers.

Prior to the trigger pulse, the electrical charge accumulated by the CCD's photoelements is discarded at each HDRV signal. The integration period, or shutter speed, begins when the trigger pulse is provided to the camera. At that point, the photoelements continue to accumulate charge until the transfer clock occurs. Thus, the integration period, or shutter speed, is determined by the relative time between the trigger pulse (TRIG) and the camera's transfer clock signal.

Because of the relationship between the trigger signal and the transfer clock, the shutter control circuit must anticipate the occurrence of the next transfer clock, and provide the trigger pulse at the appropriate point prior to the transfer clock. This is accomplished by relying on the known relationship between HDRV signals and the transfer clock.

The interval between HDRV signals is approximately 64 microseconds ($\mu$s). The transfer clock occurs approximately 35 $\mu$s after the preceding HDRV. In addition, the CCD elements have already stored 64 $\mu$s worth of charge when the trigger pulse is received. This occurs because the trigger pulse tells the camera not to dump the charge it has already been accumulating since the last HDRV signal. Thus, the integration time equals the number of HDRV periods between the trigger pulse and the transfer clock, plus 1 HDRV period (64 $\mu$s), plus 35 82 s.

The trigger pulse function is implemented in a field programmable gate array. After the histogram is done and a new shutter setting is provided by the gain control circuit, the shutter setting is decoded and a trigger down counter is preloaded with a 7 bit number. The count is enabled and the counter counts down to 0. When the counter reaches 0, a trigger pulse is sent to the camera. The trigger pulse is 6.32 $\mu$s long and is active low. The length of the trigger pulse corresponds to the length of the HDRV pulse (91 pixel clocks).

The counter presets are determined by knowing the relative position of the HIT END pulse to the transfer clock in the CCD camera. The HIT END pulse can be generated by counting the number of HIT BITs that have been encountered, or by counting the number of lines that have been clocked out of the camera. The present inventors have determined that the HIT END pulse can be generated as late as a time 78% into the video field, and still allow the gain settings to be calculated for the worst case (earliest) trigger position, which is 1/250 second. However, as mentioned above, the preferred HIT TABLE includes pixels that are located in the middle third of the video field. As mentioned above, the A/D board also provides an LED ON signal to the control board, which turns the illumination light source on only during the CCD exposure periods.

Thus, the trigger signal must be sent at the appropriate number of HDRV signals prior to the transfer clock. The following table illustrates several typical integration times and the corresponding number of HDRV signals by which the rigger pulse must precede the transfer clock:

| Desired Shutter Speed | Desired Integration Time | HDRVs | Actual Integration Time | Actual Shutter Speed |
|---|---|---|---|---|
| 1/250 | 4.00 msec | 61 | 4.00 msec | 1/250 |
| 1/500 | 2.00 msec | 30 | 2.02 msec | 1/495 |
| 1/1000 | 1.00 msec | 14 | 995 $\mu$sec | 1/1005 |
| 1/2000 | 500 $\mu$sec | 6 | 483 $\mu$sec | 1/2070 |
| 1/4000 | 250 $\mu$sec | 2 | 227 $\mu$sec | 1/4405 |

Figure 22:
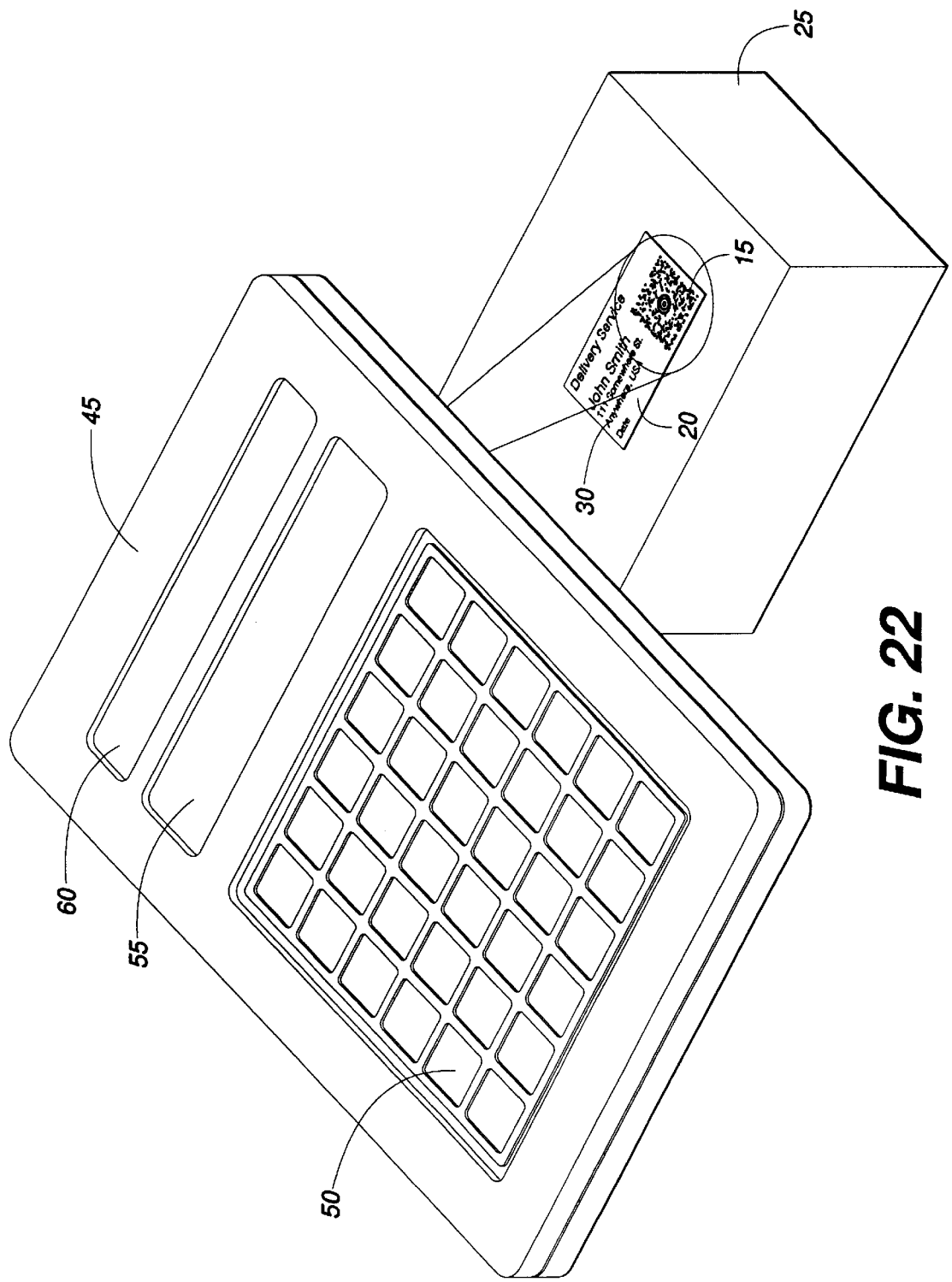
FIG. 22 is a perspective view of a portable data terminal that incorporates the automatic electronic camera of the present invention being used to read a label on a package.

While the foregoing description has centered on the preferred hand held label reader 10, those skilled in the art will appreciate that the automatic electronic camera of the present invention may also be embodied in other devices suitable for use with other types of data acquisition devices. For example, FIG. 22 illustrates an alternative embodiment in which the automatic electronic camera of the present invention is incorporated into a portable data terminal 45. The portable data terminal 45 includes a keypad 50, which provides both alphanumeric and function-related keys that allow the user to enter commands and alphanumeric data. A signature capture pad 55 is used to digitize and capture the signature of the person receiving the package. A display 60 is used to reflect data entered via the keypad and signature capture pad, and to provide shipping information (e.g., prices, etc.) in response to input data. An optical interface port (not shown) is provided in order to allow serial data to be transferred to and from the portable data terminal 45. The portable data terminal 45 is controlled by a microprocessor and other electronic circuitry (not shown). A portable data terminal including such features is described in U.S. Pat. No. 5,278,399, entitled "Data Entry Unit," the disclosure of which is incorporated herein by reference.

Furthermore, many of the functions of the automatic electronic camera have been described as being implemented in various types of application specific integrated circuits, such as field programmable gate arrays. Those skilled in the art will understand that the functions described herein may also be implemented by using a programmed general purpose microprocessor or other electronic devices.

Accordingly, the present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. In an electronic camera system for producing an image including a plurality of pixels, a method for evaluating the intensity of an image, comprising the steps of:
   providing a first memory including a plurality of bits, each bit corresponding to one of the pixels, the plurality of bits identifying a preselected subset of the pixels to be sampled to determine the intensity of the image;
   providing a second memory including a plurality of bins, each bin corresponding to one of a plurality of possible intensity levels associated with the preselected subset of the plurality of pixels; and
   computing an output indicative of the brightness of the image by
      for each pixel of the preselected subset, determining the intensity of the pixel and incrementing a bin value of a particular one of the bins in the second memory corresponding to the intensity of the pixel;
      beginning with the one of the bins corresponding to the lowest of the possible intensity levels, sequentially summing the bin values in increasing intensity level order to compute a bin-value sum;
      determining a last bin when the bin-value sum exceeds a predetermined portion of the sampled subset of the pixels; and
      assigning to the output a value corresponding to the intensity level associated with the last bin.

2. A method for evaluating the intensity of an image as recited in claim 1, wherein said preselected subset of pixels defines a pixel pattern within said image.

3. A method for evaluating the intensity of an image as recited in claim 2, wherein said pixel pattern is weighted toward the center of said image.

4. A method for evaluating the intensity of an image as recited in claim 2, wherein said pixel pattern is approximately a shotgun pattern centered at the approximate center of said image.

5. An electronic camera for producing a digital image over a range of light intensities; comprising:
   an image sensor assembly including an adjustable shutter speed control and means for generating an analog image signal, said image signal including a plurality of pixels;
   a video gain circuit configured to receive said analog image signal and to output an amplified analog image signal;
   an analog-to-digital converter including an A/D gain controller responsive to an A/D reference input and configured to convert said amplified analog image signal to a digital image signal; and
   an intensity evaluator circuit configured to receive said digital image signal and to output a correction signal varying with the intensity of at least a portion of said digital image signal;
   said shutter speed control, said video gain circuit, and said A/D reference input being responsive to said correction signal,
   said intensity evaluator circuit including
      a first memory including a plurality of bits, each of said plurality of bits corresponding to one of said plurality of pixels, said plurality of bits including a predetermined number of hit bits, said hit bits identifying a preselected subset of said plurality of pixels to be sampled to determine the intensity of said image;
      a second memory including a plurality of bins, each of said bins corresponding to one of a plurality of possible intensity levels associated with said preselected subset of said plurality of pixels,
   said correction signal being determined by
      determining, for each of said preselected subset of said plurality of pixels, the intensity of said pixel and incrementing the bin in said second memory corresponding to the intensity of said pixel;
      sequentially summing the values in said bins;
      determining when said sum exceeds a predetermined number; and
      defining a last bin value responsive to said sum exceeding said predetermined number.

6. An electronic camera as recited in claim 5, wherein said intensity evaluator circuit generates a shutter trigger pulse derived from said correction signal, and wherein said shutter speed control is response to said trigger pulse.

7. An electronic camera as recited in claim 5, wherein said intensity evaluator circuit generates a digital value derived from said correction signal, and wherein said video gain circuit is responsive to said digital value.

8. An electronic camera as recited in claim 5, wherein said intensity evaluator circuit generates an analog voltage level derived from said correction signal, and wherein said A/D gain controller is responsive to said analog voltage level.

9. An electronic camera system for producing an image including a plurality of pixels and evaluating the intensity of an image, comprising:
   a first memory including a plurality of bits, each bit corresponding to one of the pixels, the plurality of bits identifying a preselected subset of the pixels to be sampled to determine the intensity of the image;
   a second memory including a plurality of bins, each bin corresponding to one of a plurality of possible intensity levels associated with the preselected subset of the plurality of pixels; and means for computing an output indicative of the brightness of the image by for each pixel of the preselected subset, determining the intensity of the pixel and incrementing a bin value of a particular one of the bins in the second memory corresponding to the intensity of the pixel;

beginning with the one of the bins corresponding to the lowest of the possible intensity levels, sequentially summing the bin values in increasing intensity level order to compute a bin-value sum;

determining a last bin when the bin-value sum exceeds a predetermined portion of the sampled subset of the pixels; and assigning to the output a value corresponding to the intensity level associated with the last bin.

* * * * *